United States Patent
Hoehle et al.

(10) Patent No.: US 11,543,031 B2
(45) Date of Patent: Jan. 3, 2023

(54) SHAFT SEAL ASSEMBLY

(71) Applicant: Inpro/Seal LLC, Rock Island, IL (US)

(72) Inventors: Neil F. Hoehle, Solon, IA (US); Chandhini Gowthaman, Bettendorf, IA (US)

(73) Assignee: Inpro/Seal LLC, Rock Island, IL (US)

( * ) Notice: Subject to any disclaimer, the term of this patent is extended or adjusted under 35 U.S.C. 154(b) by 296 days.

(21) Appl. No.: 16/588,197

(22) Filed: Sep. 30, 2019

(65) Prior Publication Data
US 2020/0103035 A1   Apr. 2, 2020

Related U.S. Application Data

(60) Provisional application No. 62/738,797, filed on Sep. 28, 2018.

(51) Int. Cl.
| | |
|---|---|
| *F16J 15/44* | (2006.01) |
| *F16J 15/18* | (2006.01) |
| *F16J 15/54* | (2006.01) |
| *F16J 15/447* | (2006.01) |

(52) U.S. Cl.
CPC ........... *F16J 15/187* (2013.01); *F16J 15/441* (2013.01); *F16J 15/4472* (2013.01); *F16J 15/54* (2013.01)

(58) Field of Classification Search
CPC ...... F16J 15/187; F16J 15/441; F16J 15/4472; F16J 15/54
See application file for complete search history.

(56) References Cited

U.S. PATENT DOCUMENTS

| | | |
|---|---|---|
| 3,080,170 A | 3/1963 | Colby |
| 3,240,502 A | 3/1966 | Snyder |
| 3,243,212 A | 3/1966 | Diethelm |
| 3,254,745 A | 6/1966 | Olimpijevich et al. |
| 3,572,855 A | 3/1971 | Weichsel |
| 3,683,474 A | 8/1972 | Young, Jr. |

(Continued)

FOREIGN PATENT DOCUMENTS

| | | |
|---|---|---|
| CA | 1158683 A2 | 12/1983 |
| CN | 101155988 | 4/2008 |

(Continued)

OTHER PUBLICATIONS

TW Office Action in Taiwanese Appln. No. 108135297, dated Dec. 8, 2020, 7 pages (with English Translation).

(Continued)

*Primary Examiner* — Vishal A Patel
(74) *Attorney, Agent, or Firm* — Fish & Richardson P.C.

(57) ABSTRACT

An illustrative embodiment of a shaft seal assembly generally includes a first stator, a second stator, and a throttle member. In one illustrative embodiment, the second stator may be formed with a main body and an access plate positioned radially interior with respect to a portion of the first stator. The first stator and second stator may engage one another about a semi-spherical interface comprised of a convex surface on the second stator and a concave surface on the first stator. The second stator may include an internal channel in which a throttle member may be positioned, wherein a radially interior surface of the throttle member may be positioned a shaft.

20 Claims, 35 Drawing Sheets

(56) References Cited

U.S. PATENT DOCUMENTS

| | | | |
|---|---|---|---|
| 3,907,307 A * | 9/1975 | Maurer | F16J 15/166 |
| | | | 277/513 |
| 4,105,261 A | 8/1978 | Myers et al. | |
| 4,305,592 A * | 12/1981 | Peterson | B63H 23/321 |
| | | | 277/430 |
| 4,402,514 A | 9/1983 | Ryan et al. | |
| 4,418,924 A | 12/1983 | Mack | |
| 4,466,619 A | 8/1984 | Adams | |
| 4,480,842 A | 11/1984 | Mahyera et al. | |
| 4,575,102 A | 3/1986 | Raj et al. | |
| 4,606,712 A | 8/1986 | Vondra | |
| 4,743,034 A | 5/1988 | Kakabaker et al. | |
| 4,858,962 A | 8/1989 | Bolling et al. | |
| 4,948,151 A | 8/1990 | Janzen et al. | |
| 4,990,069 A | 2/1991 | Guittet et al. | |
| 5,480,161 A | 1/1996 | Borowski | |
| 5,636,849 A * | 6/1997 | Jonsson | D21D 1/40 |
| | | | 277/505 |
| 5,730,447 A | 3/1998 | Dawson et al. | |
| 5,787,791 A | 8/1998 | Vertanen | |
| 5,799,905 A | 9/1998 | Rokita | |
| 5,799,950 A | 9/1998 | Allen et al. | |
| 5,967,524 A | 10/1999 | Fedorovich | |
| 6,004,037 A | 12/1999 | Harris et al. | |
| 6,145,843 A | 11/2000 | Hwang | |
| 6,168,163 B1 | 1/2001 | Thorson et al. | |
| 6,386,546 B1 | 5/2002 | Fedorovich | |
| 6,390,477 B1 | 5/2002 | Drago et al. | |
| 6,446,976 B1 | 9/2002 | Key et al. | |
| 6,585,416 B1 | 7/2003 | Rimmer | |
| 6,592,127 B1 | 7/2003 | Flower et al. | |
| 6,648,336 B1 | 11/2003 | Kostrzewsky et al. | |
| 6,955,473 B2 | 10/2005 | Reddehase et al. | |
| 7,055,825 B2 | 6/2006 | Watanabe et al. | |
| 7,090,403 B2 | 8/2006 | Orlowski et al. | |
| 7,396,017 B2 | 7/2008 | Orlowski et al. | |
| 7,631,878 B1 | 12/2009 | Orlowski et al. | |
| 7,726,661 B2 | 6/2010 | Orlowski et al. | |
| 8,267,635 B2 * | 9/2012 | Brey | B65G 65/44 |
| | | | 414/306 |
| 8,979,093 B2 | 3/2015 | Orlowski et al. | |
| 2003/0235354 A1 | 12/2003 | Orlowski et al. | |
| 2005/0082765 A1 | 4/2005 | Khonsari et al. | |
| 2007/0013142 A1 | 1/2007 | Chitren | |
| 2007/0241514 A1 | 10/2007 | Orlowski et al. | |
| 2008/0089627 A1 | 4/2008 | Yamamoto et al. | |
| 2010/0253005 A1 | 10/2010 | Liarakos et al. | |
| 2016/0245410 A1 | 8/2016 | Hoehle et al. | |

FOREIGN PATENT DOCUMENTS

| | | | |
|---|---|---|---|
| CN | 101825180 A | | 9/2010 |
| DE | 1054795 B | | 4/1959 |
| DE | 1922007 A1 | * | 4/1969 |
| EP | 0623768 A1 | | 11/1994 |
| EP | 1967774 A | | 9/2008 |
| JP | 61165073 A | | 7/1986 |
| JP | 2005016557 A | | 1/2005 |
| JP | 10299905 | | 1/2007 |
| TW | 201040417 A | | 11/2010 |
| TW | 201818007 | | 2/2018 |
| WO | 9805890 A1 | | 2/1998 |
| WO | 2007008270 A1 | | 1/2007 |

OTHER PUBLICATIONS

PCT International Search Report and Written Opinion in International Appln. No. PCT/US2019/053818, dated Dec. 19, 2019, 7 pages.

Notification of Second Office Action, dated Sep. 8, 2017, all pages, State Intellectual Property Office of China.

Inpro-P0103-PCT-ISR-Written-Opinion, PCT/US2013/076752, dated Apr. 15, 2014.

Taiwan Intellectual Property Office, Office Action and Search Report with translation, dated Sep. 23, 2016.

Extended Search Report in European Appln. No. 19866450.0, dated Jan. 19, 2022, 8 pages.

Office Action in Chinese Appln. No. 201980064070.4, dated Sep. 5, 2022, 23 pages (with English translation).

* cited by examiner

SHAFT SEAL ASSEMBLY

CROSS REFERENCE TO RELATED APPLICATIONS

The present application claims priority from provisional U.S. patent application Ser. No. 62/738,797 filed on Sep. 28, 2018.

STATEMENT REGARDING FEDERALLY SPONSORED RESEARCH OR DEVELOPMENT

No federal funds were used to create or develop the invention herein.

FIELD OF THE INVENTION

The present invention relates to a shaft seal assembly with multiple embodiments. In certain embodiments, the shaft seal assembly may be used as a product seal between a product vessel and a shaft therein.

BRIEF DESCRIPTION OF THE DRAWINGS

The accompanying drawings, which are incorporated in and constitute a part of this specification, illustrate embodiments and together with the description, serve to explain the principles of the apparatuses and methods. Understanding that these drawings depict only typical embodiments thereof and are not therefore to be considered limited of its scope, the apparatuses and method will be described and explained with additional specificity and detail through the use of the accompanying drawings.

DETAILED DESCRIPTION—ELEMENT LISTING (FIGS. 1-12)

Figure 2:
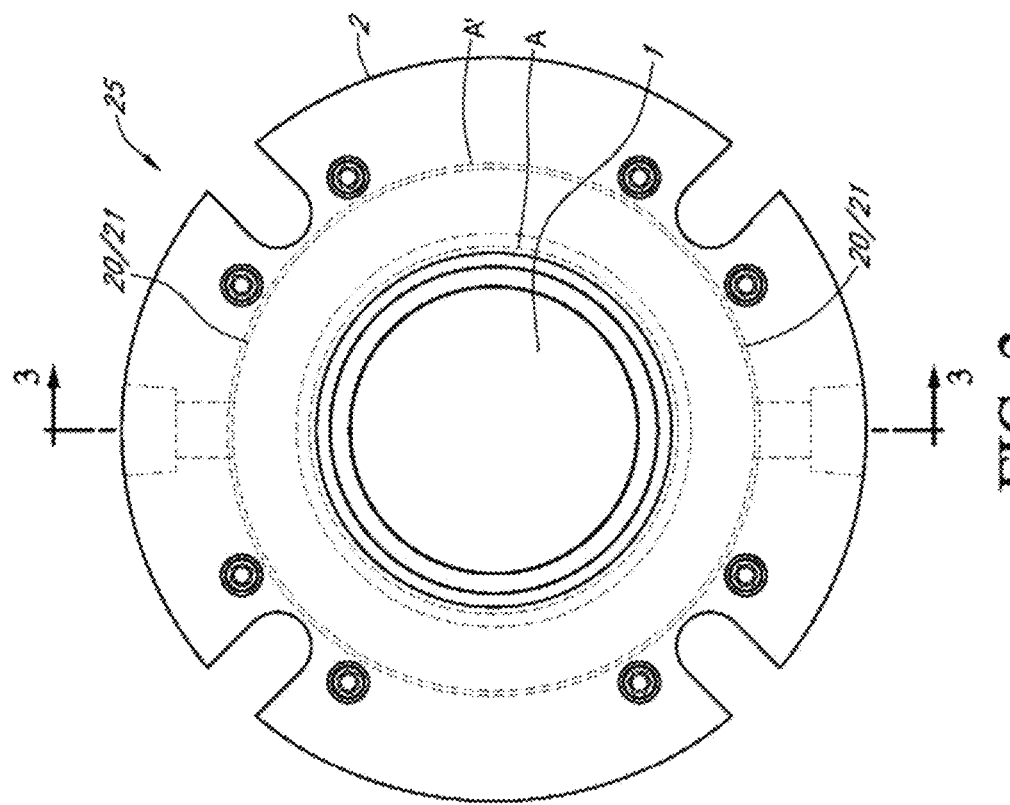
FIG. 2 is an exterior end view of the shaft seal assembly with the shaft element aligned.

| Description | Element No. |
| --- | --- |
| Shaft | 1 |
| Fixed stator | 2 |
| Fixed stator (part-line) | 2a |
| Labyrinth seal | 3 |
| Radiused face | 3a |
| Floating stator | 4 |
| Fluid return pathway | 5 |
| Shaft seal clearance | 6 |
| First o-ring | 7 |
| Anti-rotation pin | 8 |
| Vent | 9 |
| Anti-rotation groove (floating stator) | 10 |
| Spherical interface | 11 |
| Anti-rotation pin | 12 |
| Second o-ring | 13 |
| Labyrinth seal pattern grooves | 14 |
| First o-ring channel | 15 |
| Cavity for anti-rotation device (fixed stator) | 16 |
| Axial face of labyrinth seal | 17 |
| Axial face of floating stator | 18 |
| Second o-ring channel | 19 |
| First clearance between floating stator/fixed stator | 20 |
| Second clearance between floating stator/fixed stator | 21 |
| Throttle groove | 22 |
| Labyrinth pattern annular groove | 23 |
| Sleeve | 24 |
| Shaft seal assembly | 25 |
| Throttle (alignment skate) | 26 |
| Floating stator annular groove | 27 |
| Labyrinth seal passage | 28 |
| Floating stator passage | 29 |
| Housing | 30 |
| Angle of misalignment | 31 |
| Bearings and bearing cavity | 32 |
| Mounting bolts | 33 |
| Vessel wall | 34 |
| Pressure balanced shaft seal assembly | 40 |
| Labyrinth seal interior face | 42 |
| Floating stator interior face | 44 |
| Pressure balancing annular channel | 46 |
| First radial interface | 47a |
| Second radial interface | 47b |
| Fixed stator annular groove | 48 |
| Annular groove radial-interior surface | 48a |

DETAILED DESCRIPTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments/aspects only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Aspect" when referring to a method, apparatus, and/or component thereof does not mean that limitation, functionality, component etc. referred to as an aspect is required, but rather that it is one part of a particular illustrative disclosure and not limiting to the scope of the method, apparatus, and/or component thereof unless so indicated in the following claims.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

It is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance. Furthermore, any dimensions recited or called out herein are for exemplary purposes only and are not meant to limit the scope of the present disclosure in any way unless so recited in the claims.

Figure 4:
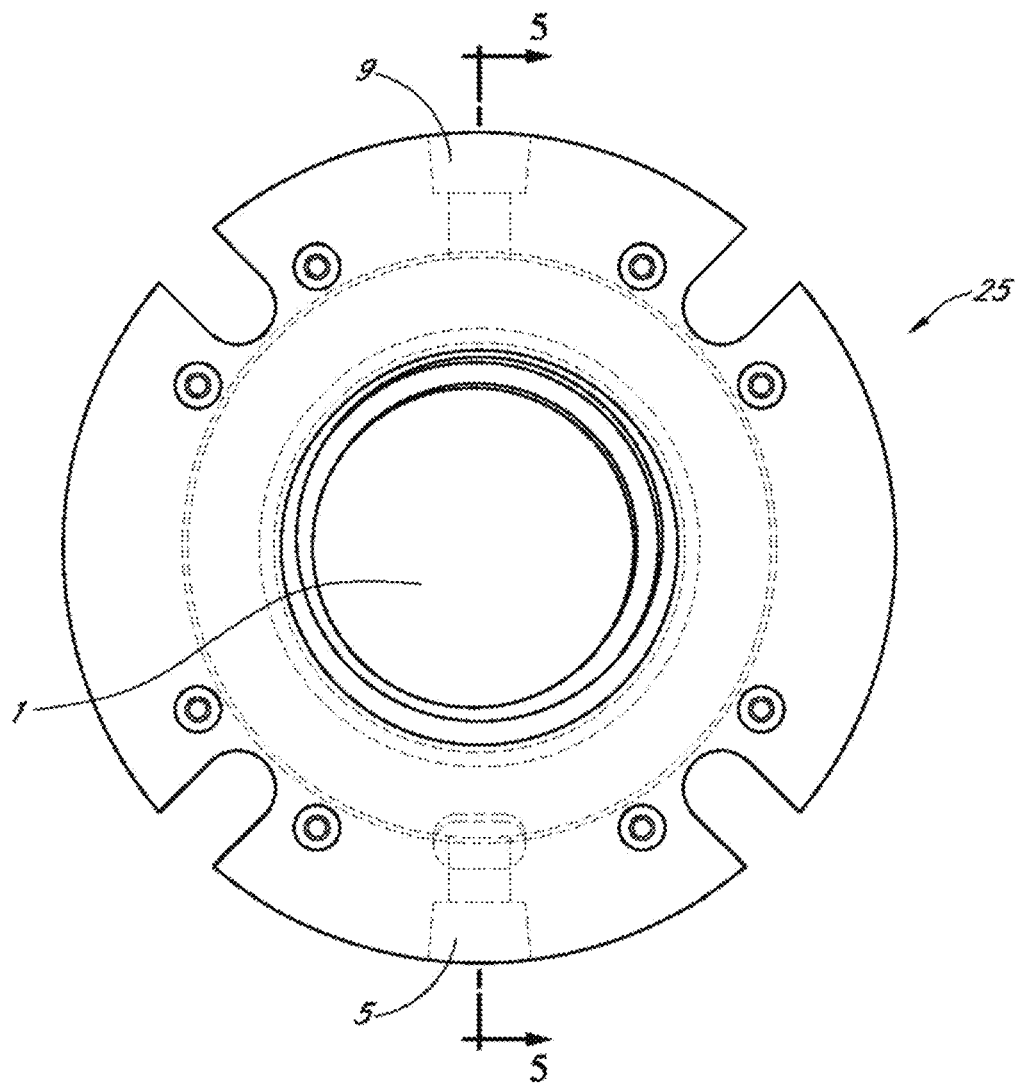
FIG. 4 is an exterior end view with the shaft misaligned.
Figure 5:
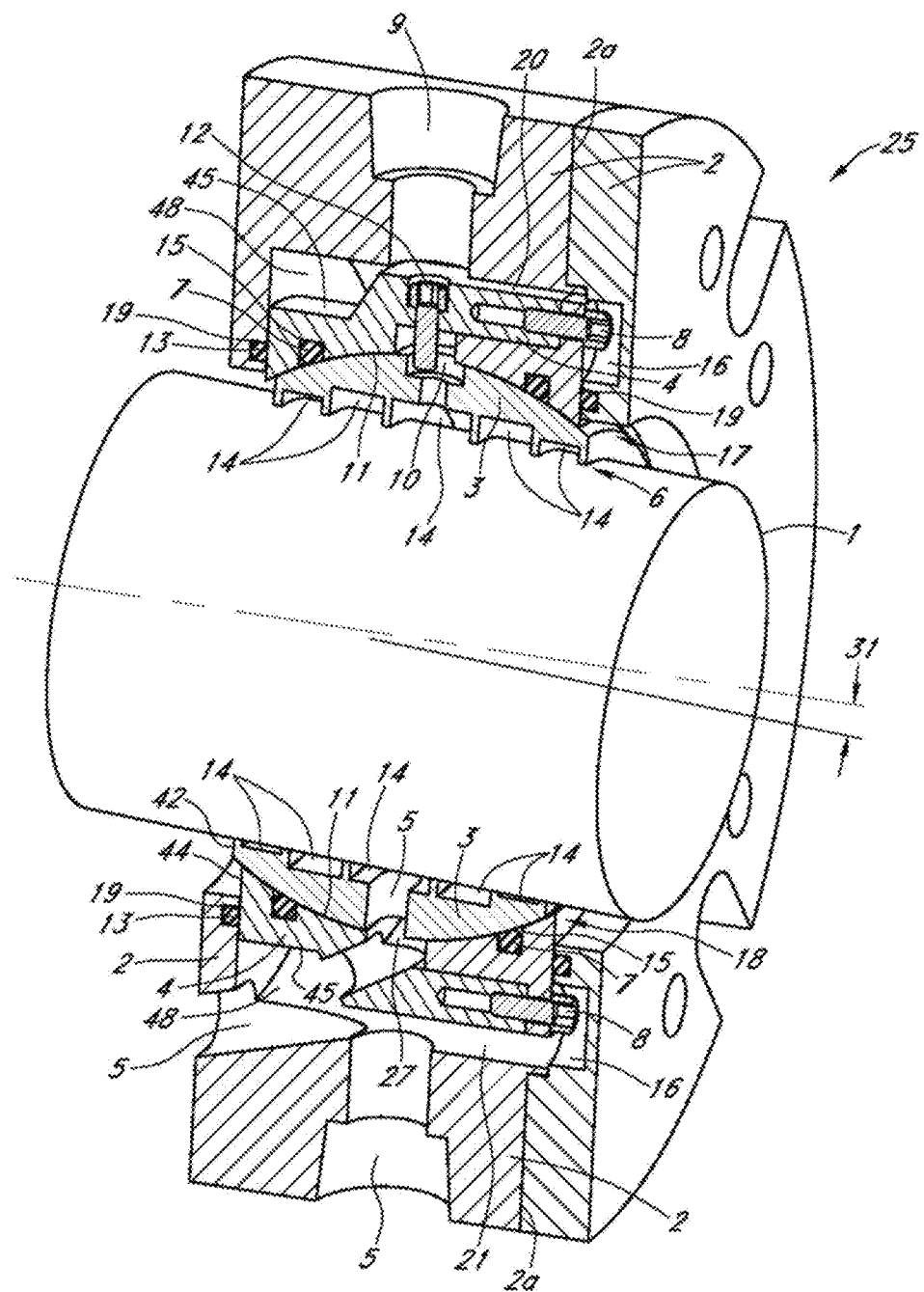
FIG. 5 is a sectional view of the first embodiment as shown in FIG. 3 with both angular and radial misalignment of the shaft applied.
Figure 6:
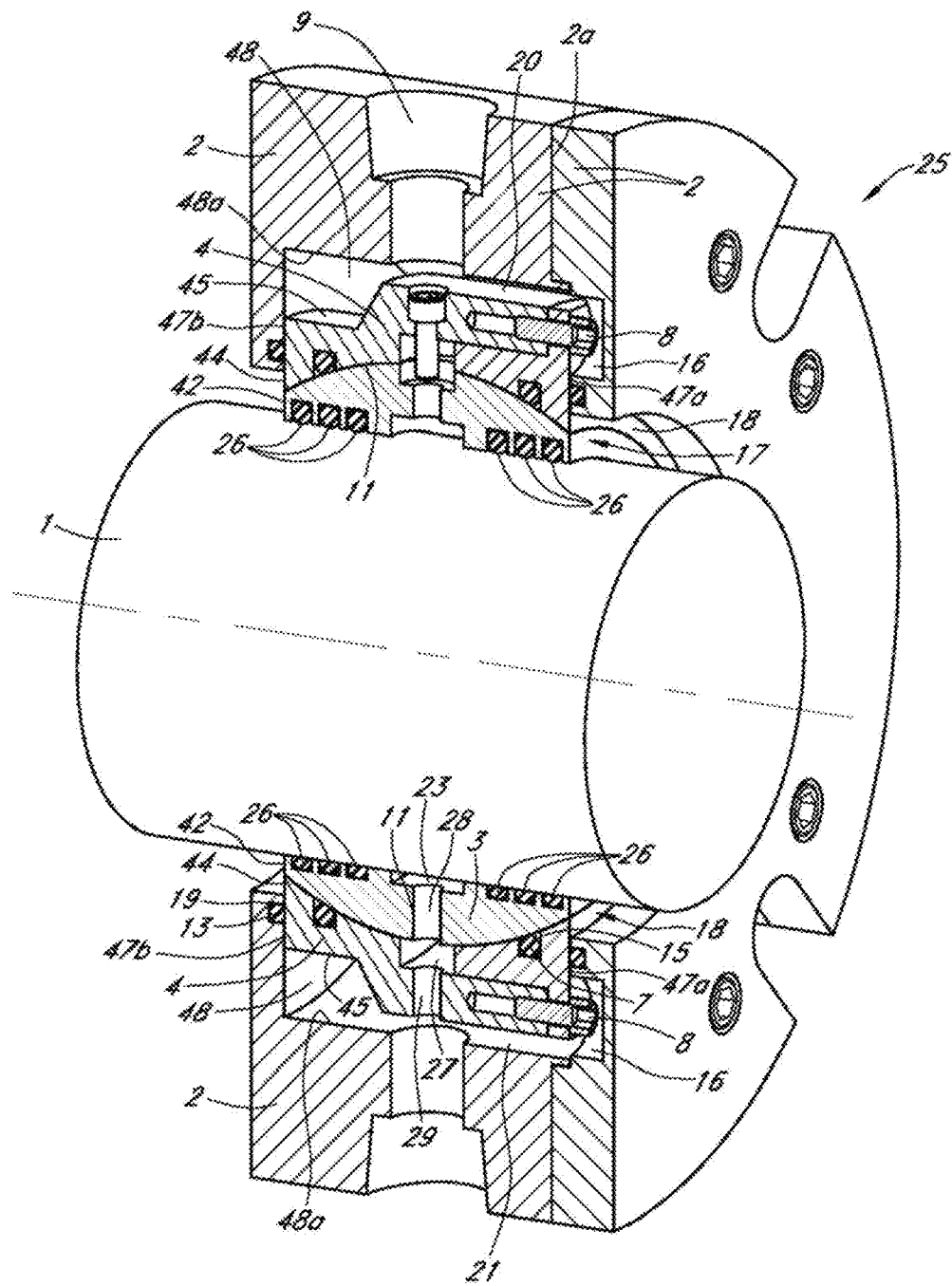
FIG. 6 is a sectional view of a second embodiment of the shaft seal assembly as shown in FIG. 2.
Figure 7:
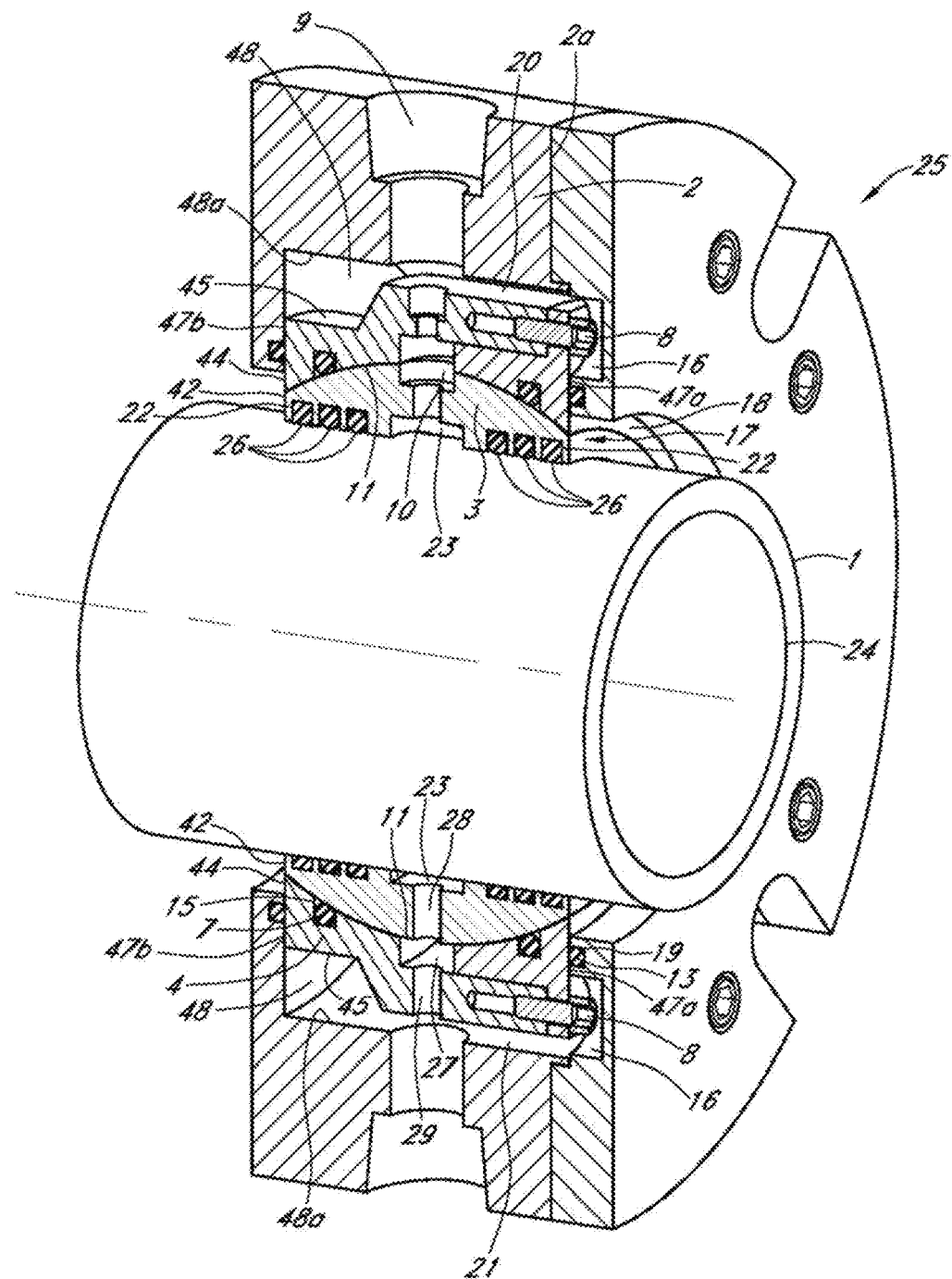
FIG. 7 is a sectional view of a third embodiment as shown in FIG. 2.

FIGS. 1-5 provide various views of a first illustrative embodiment of the shaft seal assembly 25 that allows for sealing various lubricating solutions within bearing housing 30 and/or preventing ingress of contaminants to the housing 30, which may be configured as a bearing housing. FIGS. 6 and 7 provide alternative illustrative embodiments of the shaft seal assembly 25 wherein sealing fluids are used. Applicant herein defines sealing fluids to include at least both liquids and vapors. Applicant considers air, nitrogen, water and steam as well as any other fluid that may work with the proposed shaft seal assembly to provide a pressurized fluid barrier for any and all embodiments disclosed herein to be within the purview of the present disclosure. The gas or fluid chosen may be based at least upon process suitability with the product to be sealed.

Figure 1:
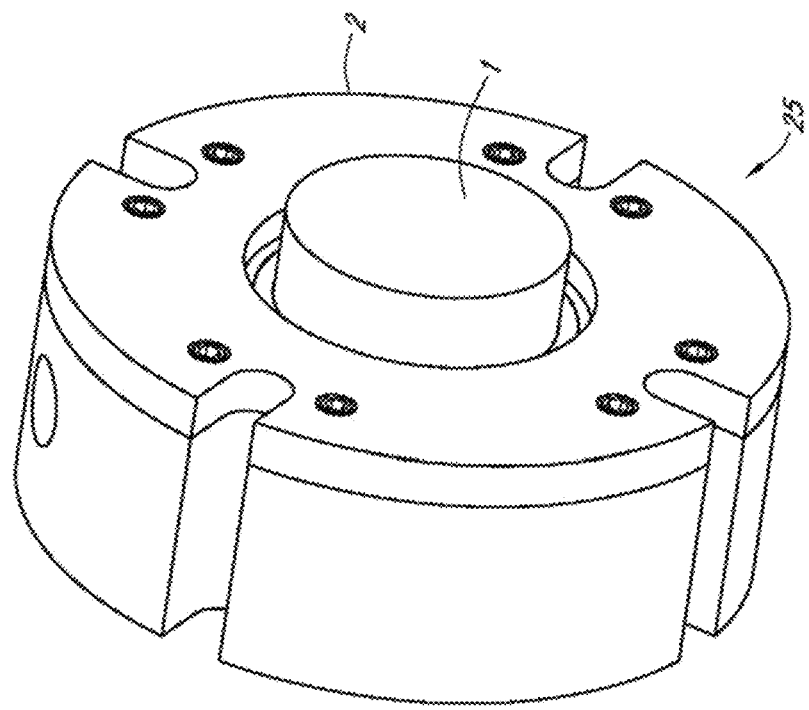
FIG. 1 is a perspective exterior view of the shaft seal assembly.

FIG. 1 is a perspective exterior view of the first illustrative embodiment of a shaft seal assembly 25 arranged and engaged with a shaft 1 inserted through the fixed stator 2 of shaft seal assembly 25. FIG. 2 is an exterior end view of the shaft seal assembly with shaft 1 aligned within the shaft seal assembly 25.

Figure 3:
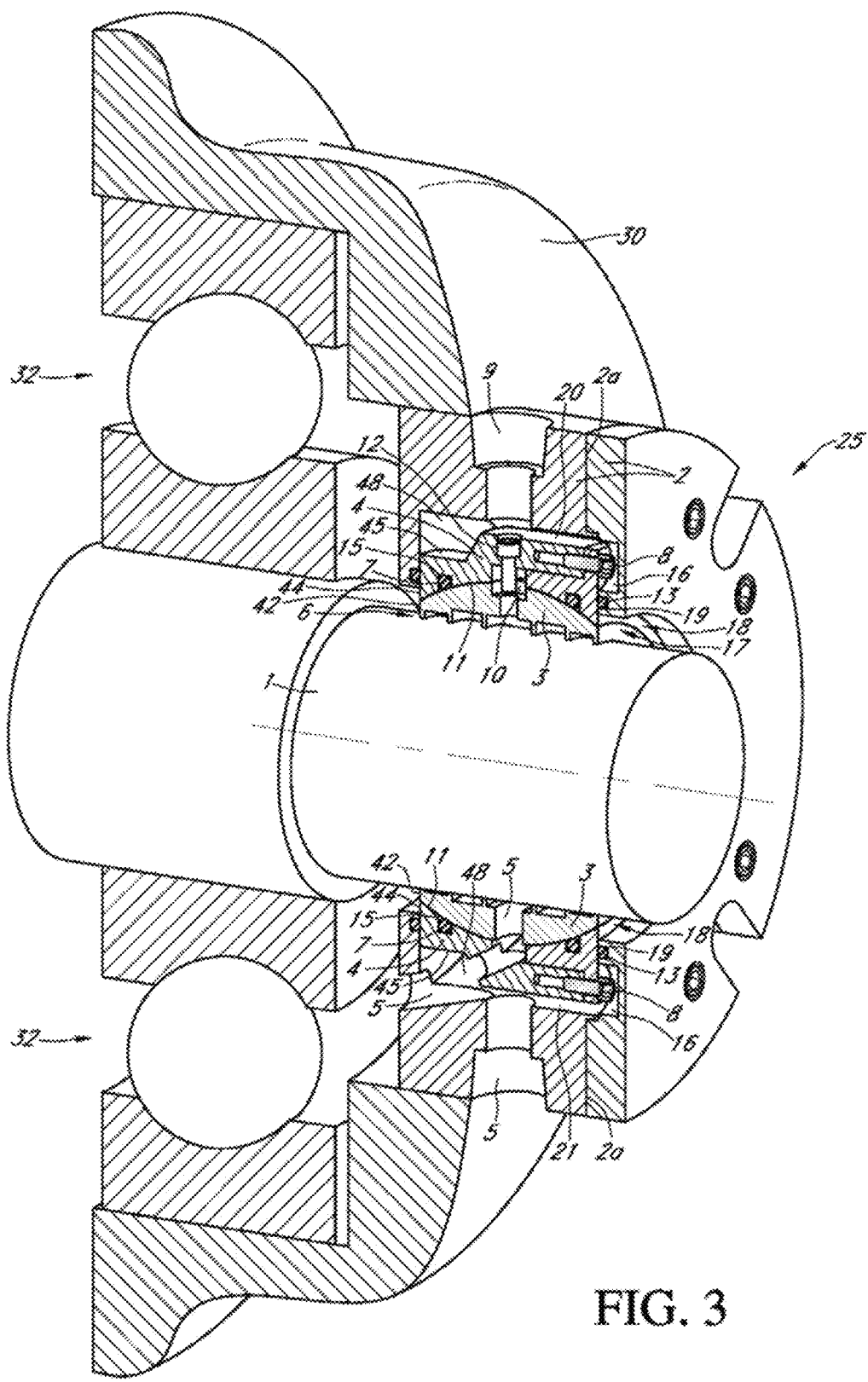
FIG. 3 is a sectional view of a first embodiment of the shaft seal assembly, as shown in FIG. 2 and mounted to a housing.

FIG. 3 is a sectional view of a first embodiment of the shaft seal assembly 25 shown in FIG. 2 illustrating that the shaft seal assembly 25 may be configured as a labyrinth seal for retaining lubrication solution within the bearing cavity 32 of housing 30 and/or preventing ingress of contaminants into the housing 30. The shaft 1 shown in FIG. 3 may experience radial, angular or axial movement relative to the fixed stator 2 or a portion thereof at various times. The fixed stator 2 of the shaft seal assembly 25 may be engaged with a housing 30 via any suitable method and/or structure, including but not limited to flange-mounted or press-fit. The shaft seal assembly 25 may also be used in applications with a rotating housing and stationary shaft. (Not shown) As required by the particular application of the shaft 1 and/or shaft seal assembly 25, the shaft 1 may be allowed to move freely in the axial direction in relation to the shaft seal assembly 25.

A labyrinth seal 3 having an interior surface may be positioned adjacent shaft 1. A defined clearance 6 may exist between the interior surface of said labyrinth seal 3 and the shaft 1. A radiused surface 3a may be configured such that it is opposite the interior surface of the labyrinth seal 3. The radiused surface 3a of the labyrinth seal 3 and the interior of the floating stator 4 may be configured to form a spherical interface 11. O-ring channels 15 and o-rings 7 may be disposed to cooperate with the radiused surface 3a of the labyrinth seal 3 to seal (or trap) fluid migration through, between and along engaged labyrinth seal 3 and floating stator 4 while maintaining a spherical interface 11, which spherical interface 11 may allow limited relative rotational movement (articulation) between labyrinth seal 3 and floating stator 4.

O-ring channels 15, as shown, may be machined into the floating stator 4 and may be positioned at the spherical interface 11 with labyrinth seal 3. O-ring channels 15 may be configured such that they are annular and continuous in relation to labyrinth seal 3. The o-ring channel 15 and o-ring 7 may also be placed in the labyrinth seal 3 adjacent the spherical interface 11. In certain embodiments, o-rings 7 may be constructed of materials that are compatible with both the product to be sealed and the preferred sealing fluid. O-ring channels 15 and o-rings 7 are but one possible combination of structures that may be used to seal various potions within the shaft seal assembly 25. Any other structures and/or method suitable for the particular embodiment of a shaft seal assembly 25 may be used without limitation.

Strategically placed anti-rotation pin(s) 12 may be inserted into anti-rotation grooves 10 and may serve to limit relative rotational movement between labyrinth seal 3 and floating stator 4. A plurality of anti-rotation grooves 10 and pins 12 may be placed around the radius of the shaft 1. If the shaft seal assembly 25 is used in combination with a sealing fluid, strategic anti-rotation pins 12 may be removed allowing corresponding anti-rotation grooves 10 to serve as a fluid passage through vent 9 and lubricant return 5, one illustrative embodiment of which is shown in FIG. 7. Additionally, the relationship of the diameters of anti-rotation pins 12 and anti-rotation grooves 10 may be selected to allow more or less angular misalignment of the shaft 1, respectively. For example, a relatively small-diameter anti-rotation pin 12 used with a large-diameter anti-rotation groove 10 would allow for greater relative movement of the labyrinth seal 3 in relation to the floating stator 4 in response to angular misalignment of shaft 1. A labyrinth seal 3 is one possible embodiment of a sealing structure that may be used adjacent to the shaft 1 within the shaft seal assembly 25. However, other structures and/or methods may be used to achieve similar functionality without limitation.

An annular channel may be formed within fixed stator 2 and may be defined by clearance 20 and 21 as allowed between the exterior of said floating stator 4 and the interior of the fixed stator 2 of shaft seal assembly 25. The annular channel of fixed stator 2 is highlighted as A-A' in FIG. 2. The annular channel of the fixed stator 2 may be formed with interior surfaces that are configured such that they are substantially perpendicular to said shaft 1. The exterior surfaces of the floating stator 4, which may be substantially encompassed within the annular channel of the fixed stator 2, may cooperatively engage with the first and second interior perpendicular faces of the fixed stator 2. An inner interface may be formed by the first (shaft seal assembly 25 inboard side) perpendicular annular channel surface of the fixed stator 2 engaging with the first (inboard side) perpendicular face of the floating stator 4. An outer interface may be formed by the second (shaft seal assembly 25 outboard side) perpendicular annular interior channel surface of the fixed stator 2 engaging with the second (outboard side) perpendicular face of the floating stator 4. O-ring channels 19 and o-rings 13 may be disposed therein and may cooperate with the surfaces of floating stator 4 that are in perpendicular to relation to shaft 1. These o-rings 13 may function to seal (or trap) fluid migration between and along engaged floating stator 4 while allowing limited relative rotational movement between floating stator 4 and fixed stator 2. Floating stator 4 and fixed stator 2 are one possible embodiment of cooperatively engaged portions of a shaft seal assembly 25 that may be configured to allow relative motion between the portions in at least one dimension, and which may be used in combination with labyrinth seal 3 within the shaft seal assembly 25. However, other structures and/or methods may be used to achieve similar functionality without limitation.

O-ring channels 19 may be configured such that they are annular and continuous in relation to shaft 1. In an embodiment not shown herein, the o-ring channels 19 and o-rings 13 may be placed in the body of the floating stator 4 rather than the fixed stator 2. It is contemplated that for many applications it may be optimal to place those o-ring channels 19 and corresponding o-rings 13 in similar proximal relation. In certain embodiments, o-rings 7 may be constructed of materials that are compatible with both the product to be sealed and the preferred sealing fluid. O-ring channels 15 and o-rings 7 are but one possible combination of structures that may be used to seal various potions within the shaft seal assembly 25. Any other structures and/or method suitable for the particular embodiment of a shaft seal assembly 25 may be used without limitation.

Strategically placed anti-rotation pin(s) 8 may be inserted into anti-rotation groove(s) 16 and may serve to limit both relative radial and rotational movement between floating stator 4 and interior side of fixed stator 2. A plurality of anti-rotation grooves 16 and pins 8 may be placed around the radius of the shaft 1. The relationship of the diameters of anti-rotation pins 8 and anti-rotation grooves 16 may also be selected to allow more or less angular misalignment of the shaft. For example, a small-diameter anti-rotation pin 8 and large-diameter fixed stator anti-rotation groove may allow for greater relative movement of the labyrinth seal 3 in response to angular misalignment of shaft 1.

The labyrinth pattern seal grooves 14 may be pressure equalized by venting through one or more vents 9. If so desired, the vents 9 may be supplied with a pressurized sealing fluid such that the sealing fluid over-pressurizes the labyrinth area 14 and shaft seal clearance 6 to increase the efficacy of shaft seal assembly 25. A spherical interface 11 between the labyrinth seal 3 and the floating stator 4 may be configured to allow for angular misalignment between the shaft 1 and fixed stator 2. O-ring channels 19 are annular with the shaft 1 and, as shown, may be machined into the fixed stator 2 and positioned at the interface between the fixed stator 2 and floating stator 4. O-ring channel 19 may also be placed in the floating stator 4 and may be engaged with o-rings 13, which may be configured to provide sealing contact with the fixed stator 2.

Figure 3A:
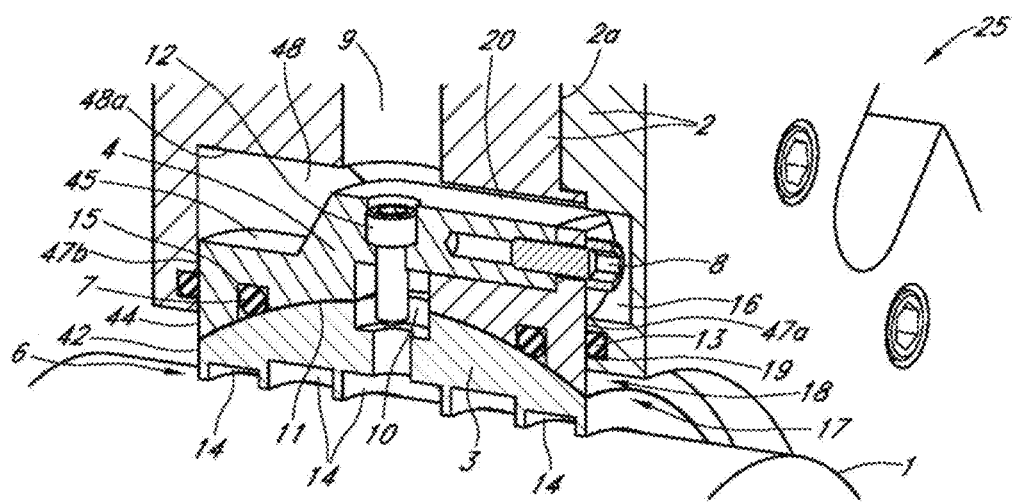
FIG. 3A illustrates the first surface seal-shaft integrity during angular and radial shaft alignment.
Figure 3B:
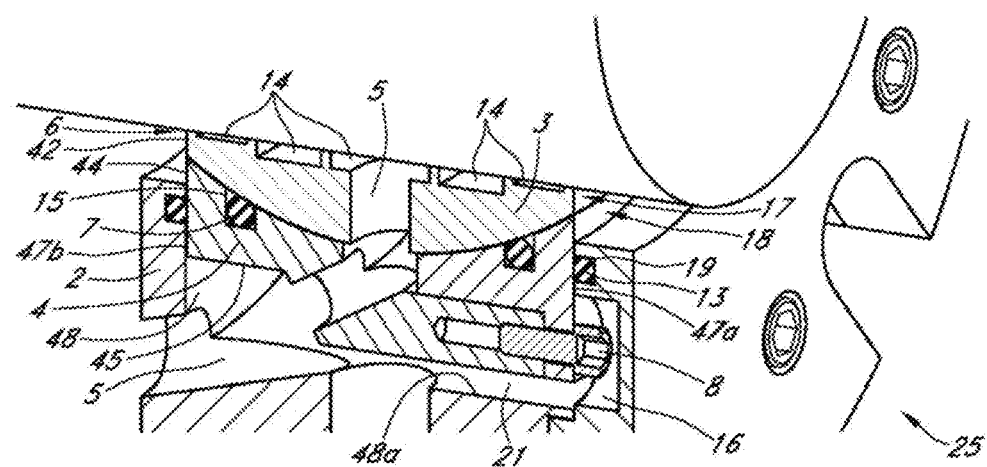
FIG. 3B illustrates second surface seal-shaft integrity during angular and radial shaft alignment.

FIG. 3A illustrates seal-shaft integrity during angular and radial shaft 1 alignment. This view highlights the alignment of the axial face 17 of the labyrinth seal 3 and the axial face 18 of the floating stator 4. Particular focus is drawn to the alignment of the axial faces 17, 18 at the spherical interface 11 between the floating stator 4 and labyrinth 3. FIG. 3B illustrates the shaft-seal integrity during angular and radial shaft 1 alignment at the surface opposite that shown in FIG. 3A. This view highlights the alignment of the axial faces 17, 18 of labyrinth seal 3 and floating stator 4, respectively, for the opposite portion of the shaft seal assembly 25 as shown in FIG. 3A. Those of ordinary skill in the art will appreciate that because the shaft 1 and the illustrative embodiments of a shaft seal assembly 25 are of a circular shape and nature, the surfaces are shown 360 degrees around shaft 1. Again, particular focus is drawn to the alignment of the axial faces 17, 18 at the spherical interface 11 between the labyrinth seal 3 and floating stator 4. FIGS. 3A and 3B also illustrate the first defined clearance 20 between the floating stator 4 and the fixed stator 2 and the second defined clearance 21 between the floating stator 4 and fixed stator 2 and opposite the first defined clearance 20.

In FIGS. 2, 3, 3A and 3B, the shaft 1 is not experiencing radial, angular or axial movement with respect to a housing 30. Accordingly, in the illustrative embodiments the width of the defined clearances 20 and 21, which may be substantially equal, may indicate little movement or misalignment upon the floating stator 4.

FIG. 4 is an exterior end view of the shaft seal assembly 25 with the rotatable shaft 1 misaligned therein. FIG. 5 is a sectional view of the first embodiment of the shaft seal assembly 25 as shown in FIG. 3 with both angular and radial misalignment of the shaft 1 applied. The shaft 1 as shown in FIG. 5 is also of the type that may experience radial, angular or axial movement relative to the fixed stator 2 (and/or housing 30) of the shaft seal assembly 25.

As shown at FIG. 5, the defined radial clearance 6 of labyrinth seal 3 with shaft 1 may be maintained even though the angle of shaft misalignment 31 has changed. The shaft 1 still may be allowed to move freely in the axial direction even though the angle of shaft misalignment 31 has changed. The arrangement of the shaft seal assembly 25 may allow the labyrinth seal 3 to move with the floating stator 4 upon introduction of radial movement of said shaft 1.

The labyrinth seal 3 and floating stator 4 may be secured together by one or more compressed o-rings 7 or any other suitable structure and/or method. Rotation of the labyrinth seal 3 within the floating stator 4 may be prevented by anti-rotation members, which may include but are not limited to screws, anti-rotation pins 8, or similar devices to inhibit rotation. The pins as shown in FIGS. 3, 3A, 3B, 5, 6 and 7 are one structure for preventing rotation of the labyrinth seal 3 and floating stator 4. However, any other suitable structure and/or method may be used to achieve similar results without limitation.

Lubricant, sealing fluid, or other media may be collected and drained through a series of one or more optional drains or lubricant return pathways 5. The labyrinth seal 3 may be pressure-equalized by venting through one or more vents 9. If so desired, the vents 9 may be supplied with pressurized air or other gas or fluid media to over-pressurize the labyrinth seal 3 to increase seal efficacy. The combination of close tolerances between the cooperatively engaged mechanical portions of the shaft seal assembly 25 and pressurized sealing fluid may inhibit both product and contaminant contact with the internals of the shaft seal assembly 25. The spherical interface 11 between the labyrinth seal 3 and the floating stator 4 may be configured to allow for angular misalignment between the shaft 1 and fixed stator 2. O-ring channel 19 and o-ring 13, which may be disposed therein, may cooperate with the opposing faces of the floating stator 4, which may be configured such that they are substantially in perpendicular relation to the rotational axis of the shaft 1. In this manner, the o-rings 13 may cooperate with the floating stator 4 to seal (or trap) fluid migration between and along the floating stator 4 while allowing relative radial movement between stator 4 and fixed stator 2.

Figure 5A:
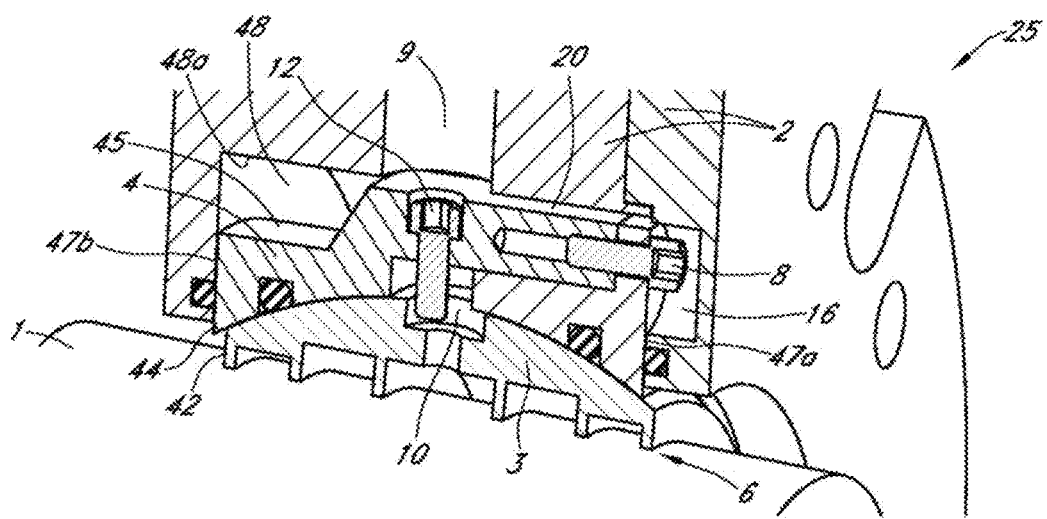
FIG. 5A illustrates first seal-shaft integrity allowed by articulation during angular and radial shaft misalignment.

FIG. 5A illustrates seal-shaft integrity allowed by the shaft seal assembly 25 during angular and radial shaft 1 misalignment. This view highlights the offset or articulation of the axial faces 17 of the labyrinth seal 3 may have in relation the axial faces 18 of the floating stator 4 for a first portion of the shaft seal assembly 25. Particular focus is drawn to the offset of the axial faces 17, 18 at the spherical interface 11 between labyrinth seal 3 and floating stator 4.

Figure 5B:
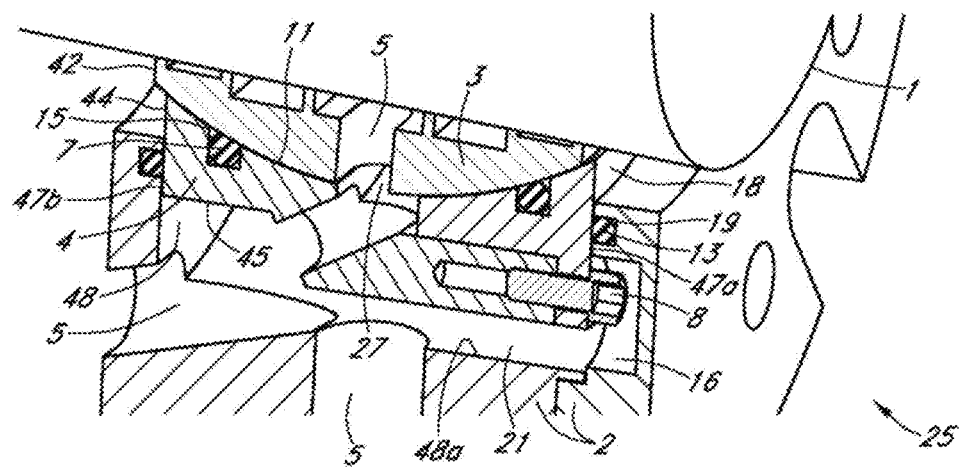
FIG. 5B illustrates second seal-shaft integrity allowed by articulation during angular and radial shaft misalignment.

FIG. 5B illustrates seal-shaft integrity for a second surface, opposite the first surface shown in FIG. 5A, during angular and radial shaft misalignment. This view highlights that during misalignment of shaft 1, axial faces 17, 18, of the labyrinth seal 3 and floating stator 4, respectively, may not be aligned but instead move (articulate) in relation to each other. The shaft-to-seal clearance 6 may be maintained in response to the shaft 1 misalignment and the overall seal integrity may not be compromised because the seal integrity of the floating stator 4 to fixed stator 2 and the floating stator 4 to labyrinth seal 3 may be maintained during shaft 1 misalignment. Those of ordinary skill in the art will appreciate that because the shaft 1 and shaft seal assembly 25 may be circular in shape and nature, the surfaces are shown 360 degrees around shaft 1. FIGS. 5A and 5B also illustrate the first clearance or gap 20 between the floating stator 4 and the fixed stator 2 and the second clearance or gap 21 between the floating stator 4 and fixed stator 2 and opposite the first clearance or gap 20 during relative movement (other than rotational) between the shaft 1 and the housing 30.

In FIGS. 4, 5, 5A and 5B, the shaft 1 is experiencing radial, angular, or axial movement during rotation of the shaft 1 and the width of the gaps or clearances 20, 21 are shown as having changed in response to that movement as compared to the gaps or clearances 20, 21 depicted in FIGS. 3, 3A and 3B. The change in dimensions of clearance 20, 21 indicate the floating stator 4 may move in response to the movement or angular misalignment of shaft 1. The shaft seal assembly 25 may allow articulation between axial faces 17, 18, maintenance of spherical interface 11 and radial movement at first and second clearance, 20, 21, respectively, while maintaining shaft seal clearance 6.

FIG. 6 is a sectional view of a second embodiment of the shaft seal assembly 25 as shown in FIG. 2 for over-pressurization with alternative labyrinth seal pattern grooves 14. In this embodiment, the labyrinth seal pattern grooves 14 may be comprised of a friction-reducing substance such as polytetrafluoroethylene (PTFE), wherein the friction-reducing substance may be configured such that it forms a close clearance to the shaft 1. PTFE is also sometimes referred to as Teflon®, which is manufactured and marketed by Dupont. PTFE is a plastic with high chemical resistance, low and high temperature capability, resistance to weathering, low friction, electrical and thermal insulation, and high lubricity. Carbon or any other materials without limitation may be substituted for PTFE to provide the necessary sealing qualities and lubricous qualities for labyrinth seal pattern grooves 14.

Pressurized sealing fluids may be supplied to over-pressurize the lubricious labyrinth pattern 26 as shown in FIG. 6. The pressurized sealing fluids may be introduced to the annular groove 23 of the throttle 26 through one or more inlets. Throttle 26 may also be referred to as "an alignment skate" by those of ordinary skill in the art. Throttle 26 may allow the labyrinth seal 3 to respond to movement of the shaft 1 caused by the misalignment of the shaft 1. The pressurized sealing fluid may pass through the close clearance formed between the shaft 1 and labyrinth seal 3 having throttle 26. The close proximity of the throttle 26 to the shaft 1 also may create resistance to the sealing fluid flow over the shaft 1 and may cause pressure to build up inside the annular groove 23. Floating annular groove 27 in cooperation and connection with annular groove 23 also may provide an outlet for excess sealing fluid to be bled out of shaft seal assembly 25 for pressure equalization or to maintain a continuous fluid purge on the shaft sealing assembly 25 during operation. An advantage afforded by this aspect of the shaft sealing assembly 25 is its application wherein "clean-in place" product-seal decontamination procedures are preferred or required. Examples would include food grade applications.

FIG. 7 illustrates shaft seal assembly 25 with the anti-rotation pin 12 removed to improve visualization of the inlets. These would typically be comprised of, but are not limited to, a series of ports, inlets or passages about the circumference of the shaft seal assembly 25. FIG. 7 also illustrates that the shape and pattern of the labyrinth seal 3 may be varied from one embodiment of the shaft seal assembly 25 to the next. The shape of throttles 26 may also be varied as shown by the square profile shown at throttle groove 22 in addition to the circular-type 26. Also note that where direct contact with the shaft 1 is not desired, the shaft seal assembly 25 may be used in combination with a separate sleeve 24 that would be attached by varied means to the shaft 1.

Figure 8:
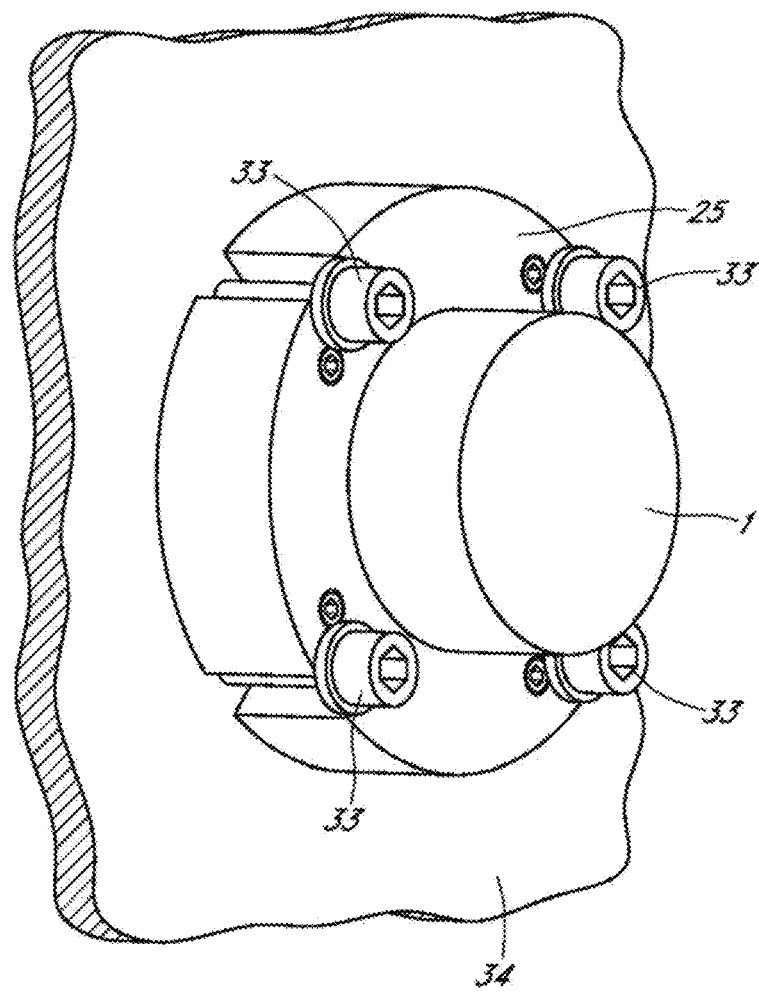
FIG. 8 is a perspective view of a fourth embodiment as mounted to a vessel wall.

FIG. 8 shows that another embodiment of the shaft seal assembly 25 wherein the shaft seal assembly 25 has been affixed to a vessel wall 34. The shaft seal assembly 25 may be affixed to vessel wall 34 through securement members (e.g., including but not limited to mounting bolts 33) to ensure improved sealing wherein shaft 1 is subjected to angular misalignment. The mounting bolts 33 and slots (not numbered) through the shaft seal assembly 25 exterior are one structure and method of mounting the shaft seal assembly 25 to a housing 30. However, any suitable structure and/or method may be used without limitation.

In certain applications, especially those wherein the process side of shaft seal assembly 25 (generally the area to the left of the shaft seal assembly 25 as shown in FIGS. 3-3B and 5-7) is at an increased pressure, it is desirable for the shaft seal assembly 25 to be configured to balance the pressure experienced by the shaft seal assembly 25 in the axial direction. A pressure balanced shaft seal assembly 40 that balances the pressure (in the axial direction) that the product applies to the labyrinth seal interior face 42 and floating stator interior face 44 is shown in FIGS. 9-12.

Figure 9:
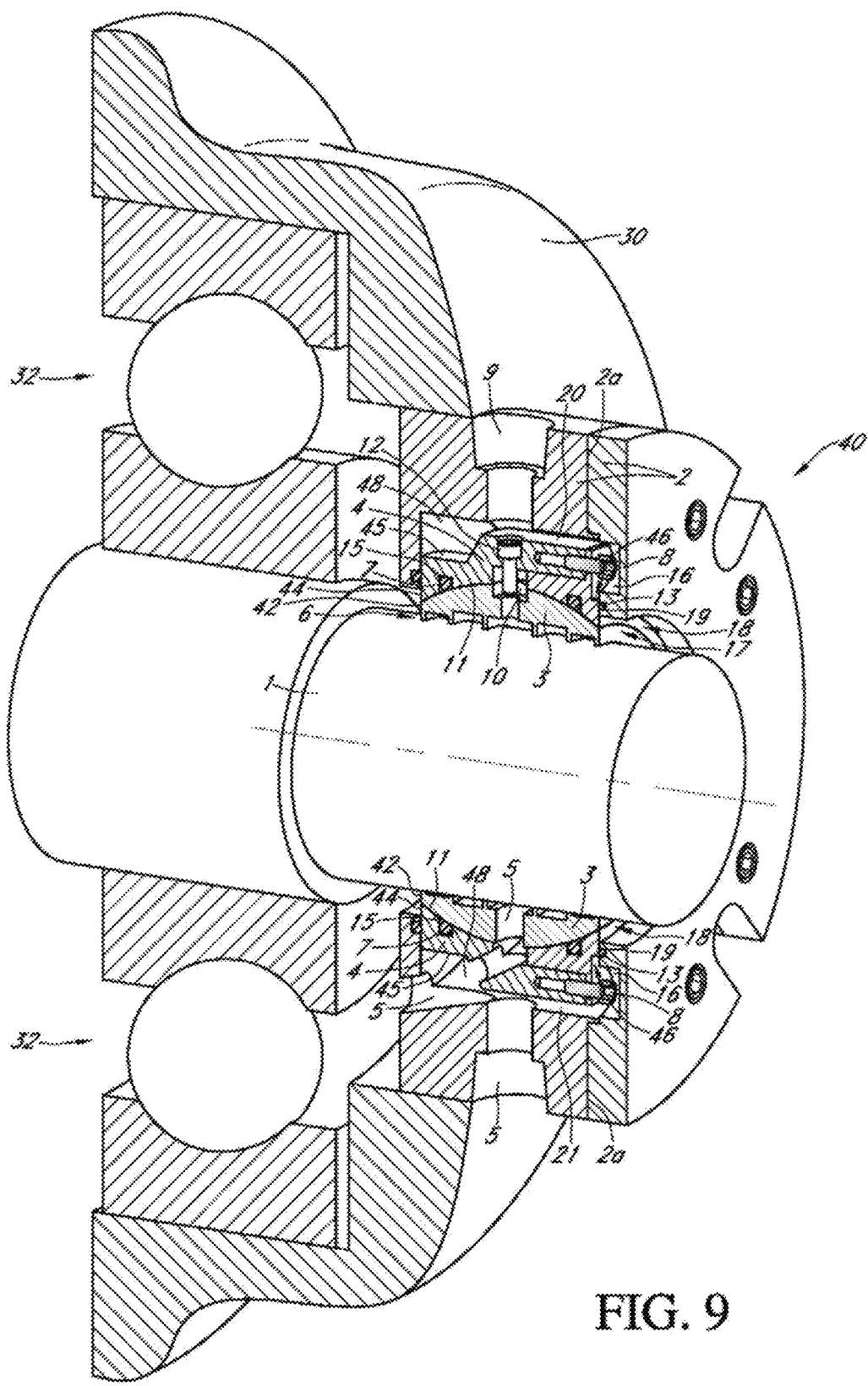
FIG. 9 is a cross-sectional view of a first embodiment of the pressure balanced shaft seal assembly mounted to a housing wherein the shaft is in alignment.
Figure 9A:
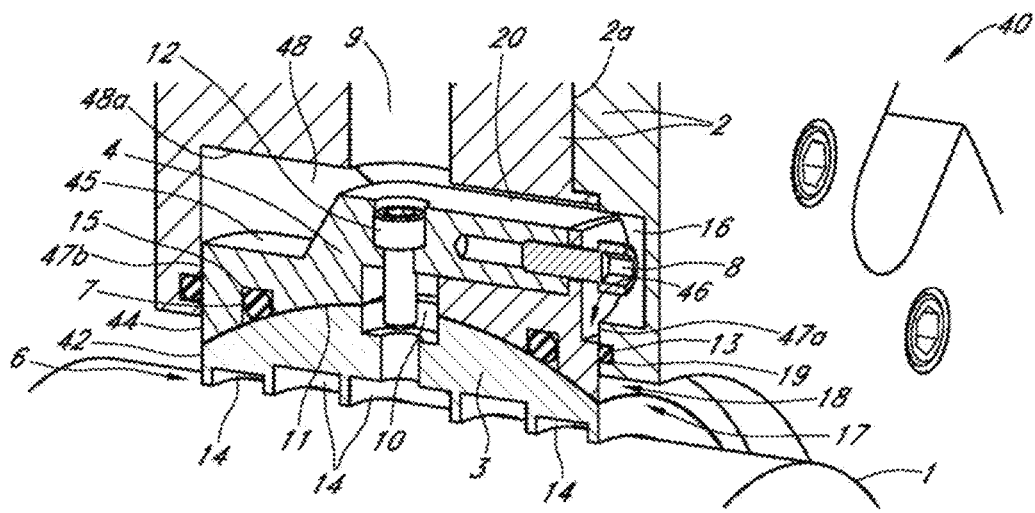
FIG. 9A is a detailed view of the portion of the first embodiment of the pressure balanced shaft seal assembly adjacent the vent wherein the shaft is in alignment.
Figure 9B:
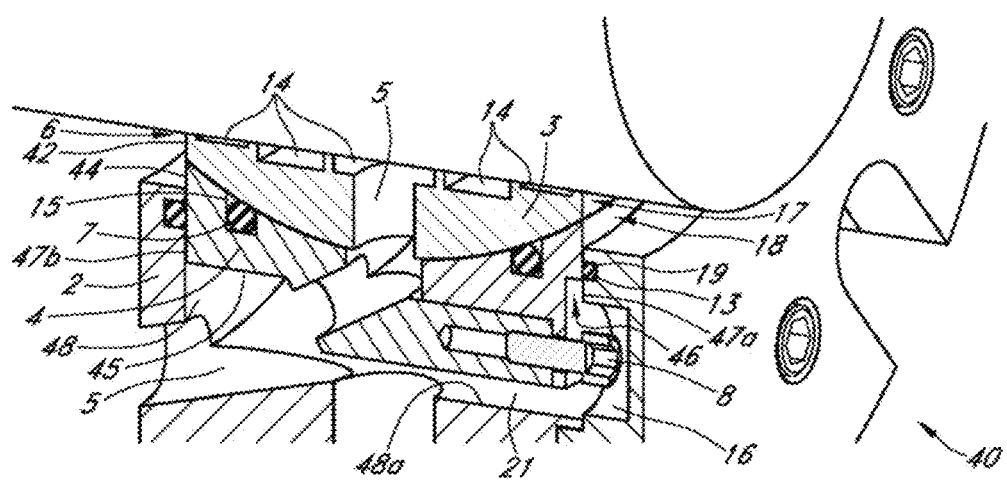
FIG. 9B is a detailed view of the portion of first embodiment of the pressure balanced shaft seal assembly adjacent the fluid return pathway wherein the shaft is in alignment.
Figure 10:
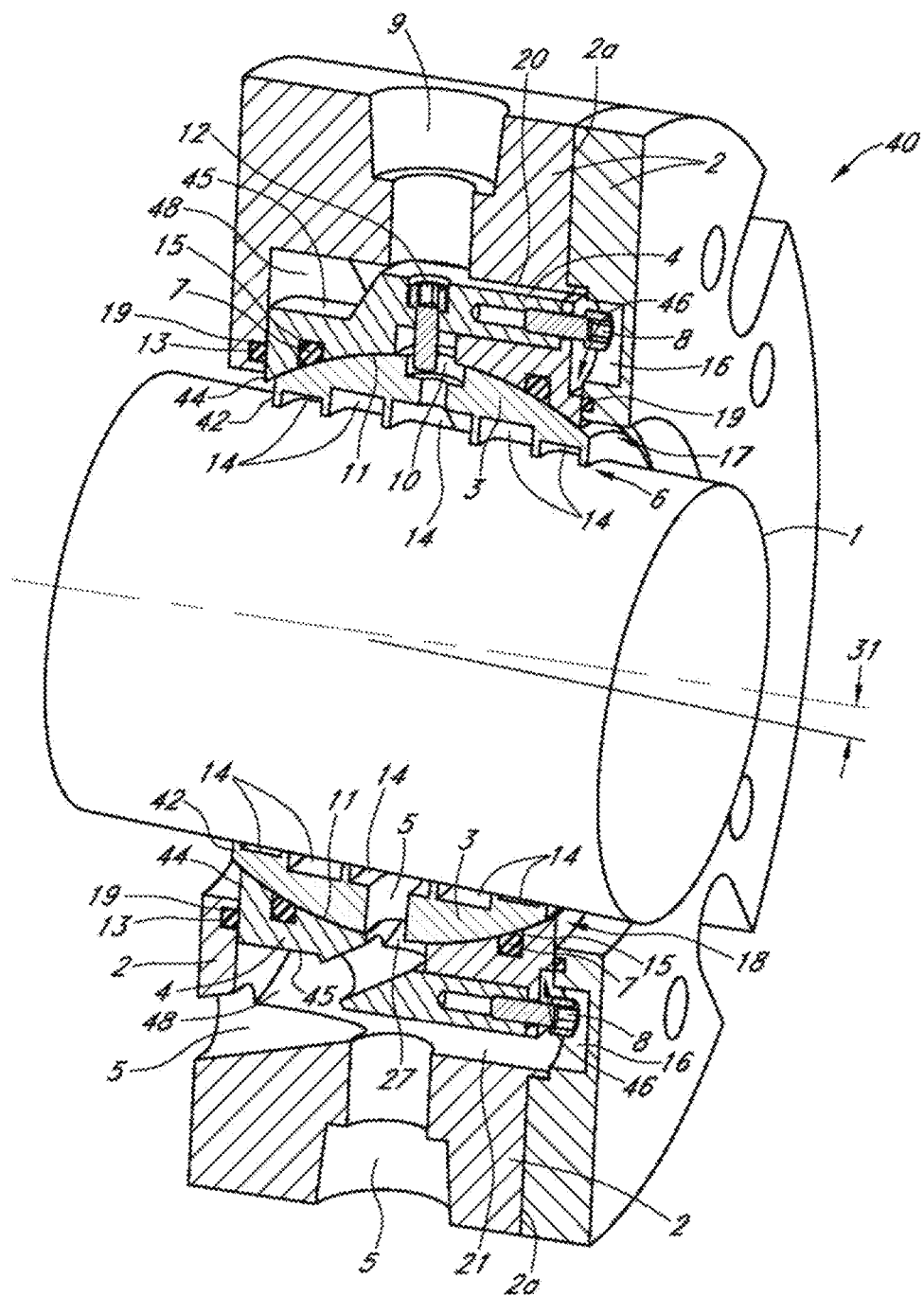
FIG. 10 is a cross-sectional view of the first embodiment of the pressure balanced shaft seal assembly shown during shaft misalignment.
Figure 10A:
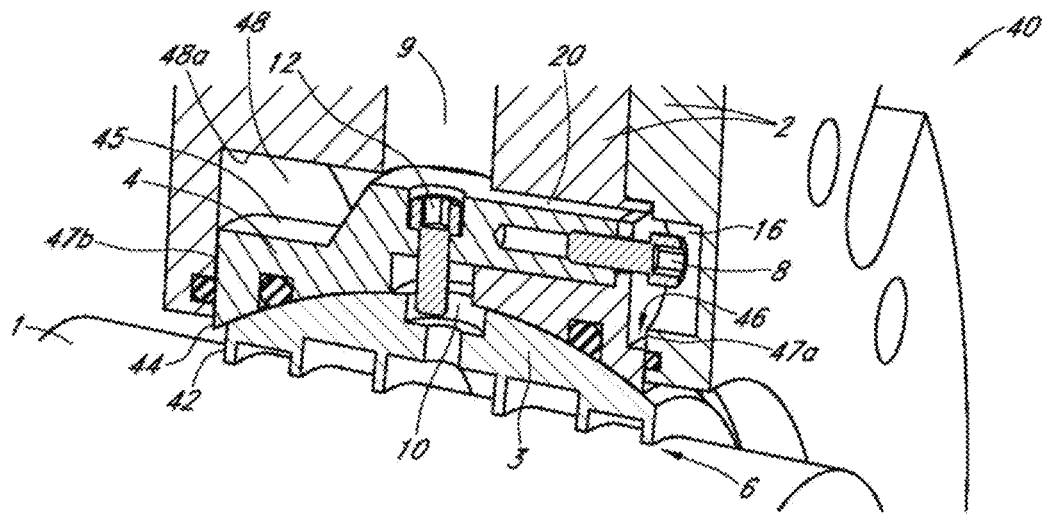
FIG. 10A is a detailed view of the portion of the first embodiment of the pressure balanced shaft seal assembly adjacent the vent wherein the shaft is misaligned.
Figure 10B:
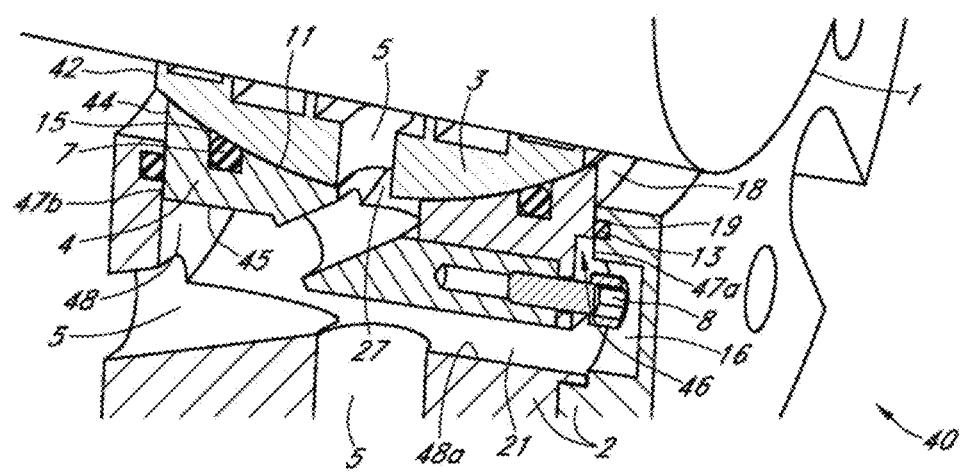
FIG. 10B is a detailed view of the portion of the first embodiment of the pressure balanced shaft seal assembly adjacent the fluid return pathway wherein the shaft is misaligned.

In the first embodiment of the pressure balanced shaft seal assembly as shown in FIGS. 9-10B, the shaft sealing member (i.e., the labyrinth seal 3 in combination with the floating stator 4) includes a pressure balancing annular channel 46. Save for the pressure balancing annular channel 46, the pressure balanced shaft seal assembly 40 may operate in generally the same manner as the shaft seal assembly 25 shown in FIGS. 1-8 and described in detail above. That is, the floating stator 4 may be positioned in the fixed stator annular groove 48. The first clearance between floating stator/fixed stator 20, which in the embodiments pictured herein may be between the floating stator radial-exterior surface 45 and the annular groove radial-interior surface 48a (shown in FIGS. 9A and 9B), may account at least for radial perturbations of the shaft 1 with respect to the housing 30. The spherical interface 11 between the floating stator 4 and the labyrinth seal 3 may account at least for angular perturbations of the shaft 1 with respect to the housing 30.

The pressure balancing annular channel 46 may be formed in the floating stator 4 adjacent the first radial interface 47a between the floating stator 4 and the fixed stator 2, as shown in FIGS. 9-10 for the first embodiment. As shown in the various embodiments pictured herein, the first radial interface 47a between the floating stator 4 and the fixed stator 2 may be adjacent the portion of the fixed stator 2 fashioned with the cavity for anti-rotation device 16. That is, the axial face of the floating stator 4 that is positioned within the fixed stator 2 and furthest from the process side of the pressure balanced shaft seal assembly 40. A second radial interface 47b between the floating stator 4 and fixed stator 2, which may be substantially parallel to the first radial interface 47a, may be positioned closer to the process side of the pressure balanced shaft seal assembly 40 as compared to the first radial interface 47a.

In many applications the optimal radial dimension of the pressure balancing annular channel 46 may be substantially similar to the radial dimension of the floating stator interior face 44 so that the area of the floating stator 4 acted upon by the product and the area of the floating stator 4 acted upon by the sealing fluid may have relatively equal surface areas. In such a configuration, the axial forces may generally balance if the product and the sealing fluid are pressurized to approximately the same value. Accordingly, the optimal radial dimension of the pressure balancing annular channel 46 may depend on the design characteristics of the entire system, and the radial dimension of the pressure balancing annular channel 46 may be any suitable amount for a particular application, whether greater or less than the radial dimension of the floating stator interior face 44. The axial dimension of the pressure balancing annular channel 46 may also vary depending on the design characteristics of the entire system, including but not limited to the specific sealing fluid that is used, the product pressure, and the pressure of the sealing fluid. In some applications the optimal axial dimension of the pressure balancing annular channel 46 will be 0.005 of an inch, but may be greater in other embodiments and less in still other embodiments.

The pressure balancing annular channel 46 may allow sealing fluid introduced into the first clearance between floating stator/fixed stator 20 (from where the sealing fluid may enter the pressure balancing annular channel 46) to act upon the floating stator 4 in an axial direction. Typically, the process side of the pressure balanced shaft seal assembly 40 (generally the area to the left of the pressure balanced shaft seal assembly 40 as shown in FIGS. 9-12) experiences forces from the process fluid acting upon the labyrinth seal interior face 42 and floating stator interior face 44. These forces are most often due to the pressure generated by the rotating equipment to which the shaft 1 is coupled. For example, if the shaft 1 is coupled to a fluid pump generating seventy pounds per square inch (psi) of head pressure, the process side of the pressure balanced shaft seal assembly 40 may be pressurized to approximately 70 psi. This pressurized fluid may act upon the labyrinth seal interior face 42 and floating stator interior face 44, and consequently urge the labyrinth seal 3 and floating stator 4 in the axial direction away from the process side of the pressure balancing shaft seal assembly 40 (i.e., generally to the right side of the drawing as depicted in FIGS. 9-12). By contrast, sealing fluid located in the pressure balancing annular channel 46 may urge the labyrinth seal 3 and floating stator 4 in the axial direction toward the process side of the pressure balancing shaft seal assembly 40, which may substantially cancel the axial force the product exerts upon the pressure balancing shaft seal assembly 40, depending on the design of the sealing fluid system.

Figure 11:
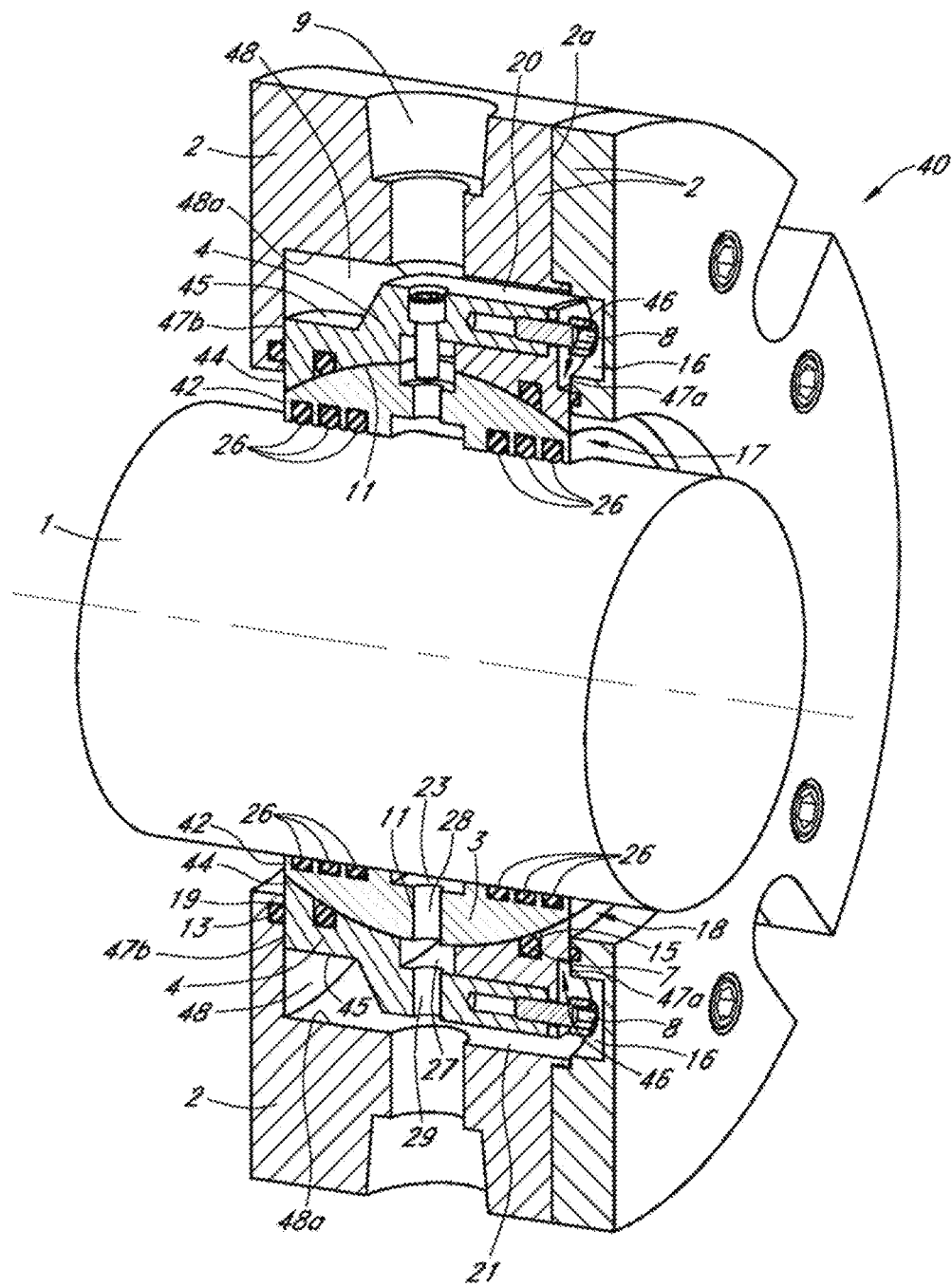
FIG. 11 is a cross-sectional view of a second embodiment of the pressure balanced shaft seal assembly wherein the shaft is in alignment.
Figure 12:
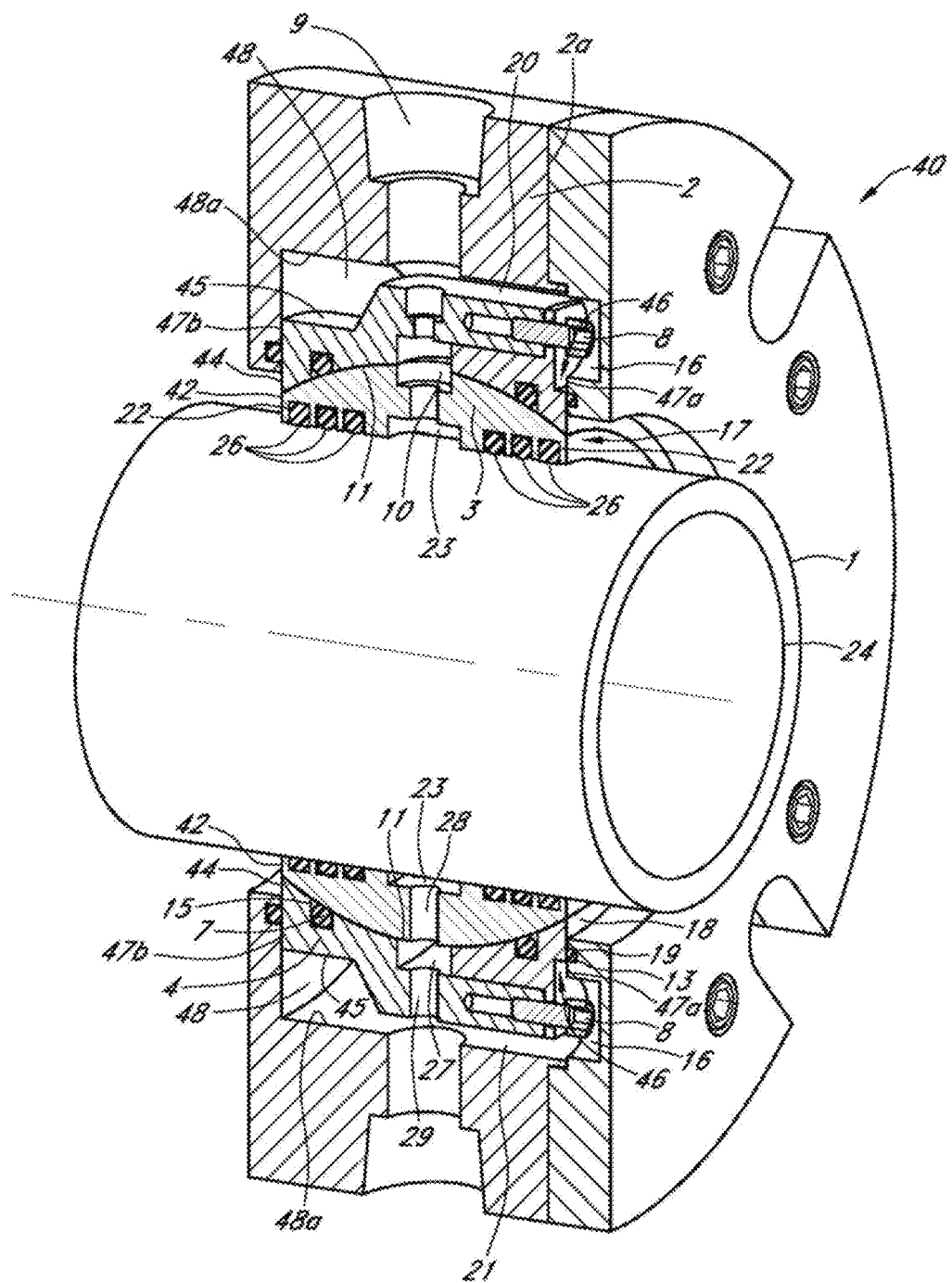
FIG. 12 is a cross-sectional view of a third embodiment of the pressure balanced shaft seal assembly wherein the shaft is in alignment.

FIGS. 11 and 12 show a second and third embodiment of the pressure balanced shaft seal assembly 40, respectively. The second and third embodiments of the pressure balanced shaft seal assembly 40 generally correspond to the second and third embodiments of the shaft seal assembly 25 as shown in FIGS. 7 and 8 and described in detail above. However, as with the first embodiment of the pressure balanced shaft seal assembly 40 as shown in FIGS. 9-10B, the second and third embodiments include a pressure balancing annular channel 46.

The various embodiments of the pressure balanced shaft seal assembly 40 pictured and described herein may be formed with a fixed stator 2 and floating stator 4 that may be comprised of two distinct portions. These embodiments may facilitate assembly of the pressure balanced shaft seal assembly 40 since in the embodiments pictured herein the majority of the floating stator 4 may be positioned within the fixed stator 2. When installing a pressure balanced shaft seal assembly 40 according to the first embodiment (as pictured in FIGS. 9-10B), the first portion of fixed stator 2 (i.e., the portion adjacent the process side of the pressure balanced shaft seal assembly 40) may be affixed to a housing 30. Next, the floating stator 4 and labyrinth seal 3 may be positioned as a singular assembled piece (wherein the components forming the spherical interface 11 have been preassembled) between the shaft 1 and the first portion of the fixed stator 2. The placement of the floating stator 4 and labyrinth seal 3 within the fixed stator 3 may forms the second axial interface 47b between the fixed stator 2 and floating stator 4. Finally, the second portion of the fixed stator 2 (i.e., the portion furthest from the process side of the pressure balanced shaft seal assembly 40) may be positioned adjacent to and affixed to the first portion of the fixed stator 2. The positioning of the second portion of the fixed stator 2 subsequently may form the first radial interface 47a between the fixed stator 2 and floating stator 4.

Alternatively, the floating stator 4 and labyrinth seal 3 may be separately positioned within the fixed stator annular groove 48. For example, after the first portion of the fixed stator 2 has been affixed to the housing 30, the first portion of the floating stator 4 may be positioned within the fixed stator annular groove 48. The placement of the first portion of the floating stator 4 within the fixed stator annular groove 48 may form the second axial interface 47b between the fixed stator 2 and floating stator 4. Next, the labyrinth seal 3 may be positioned adjacent the shaft 3, the placement of which may form a portion of the spherical interface 11 between the floating stator 4 and labyrinth seal 3. Next, the second portion of the floating stator 4 may be positioned adjacent the first portion of the floating stator 4 and affixed thereto with a plurality of anti-rotation pins 8, which may complete the spherical interface 11 between the floating stator 4 and labyrinth seal 3. Finally, the second portion of the fixed stator 2 may be affixed to the first portion of the fixed stator 2 with a plurality of bolts, rivets, or other fasteners without limitation, the placement of which may form the first axial interface 47a between the floating stator 4 and fixed stator 2. Any suitable securing members known to those skilled in the art may be used to affix the first and second portions of the floating stator 4 to one another or to affix the first and second portions of the fixed stator 2 to one another in any embodiments of a shaft seal assembly 25 or pressure balanced shaft seal assembly 40 without limitation.

ELEMENT LISTING (FIGS. 13-15A)

| Description | Element No. |
| --- | --- |
| Shaft | 10 |
| Bearing isolator | 18 |
| Housing | 19 |
| Rotor | 20 |
| Stator | 30, 31a |
| Fixed stator | 31 |
| Passage | 40, 40a |
| Spherical surface | 50, 51 |
| Clearance | 52 |
| Frictional seal | 60 |
| Flange unit | 61a |
| Center point | 80 |
| Conduit | 99 |
| Fluid | 100 |
| Pin | 101 |
| Annular recess | 102 |

Figure 13:
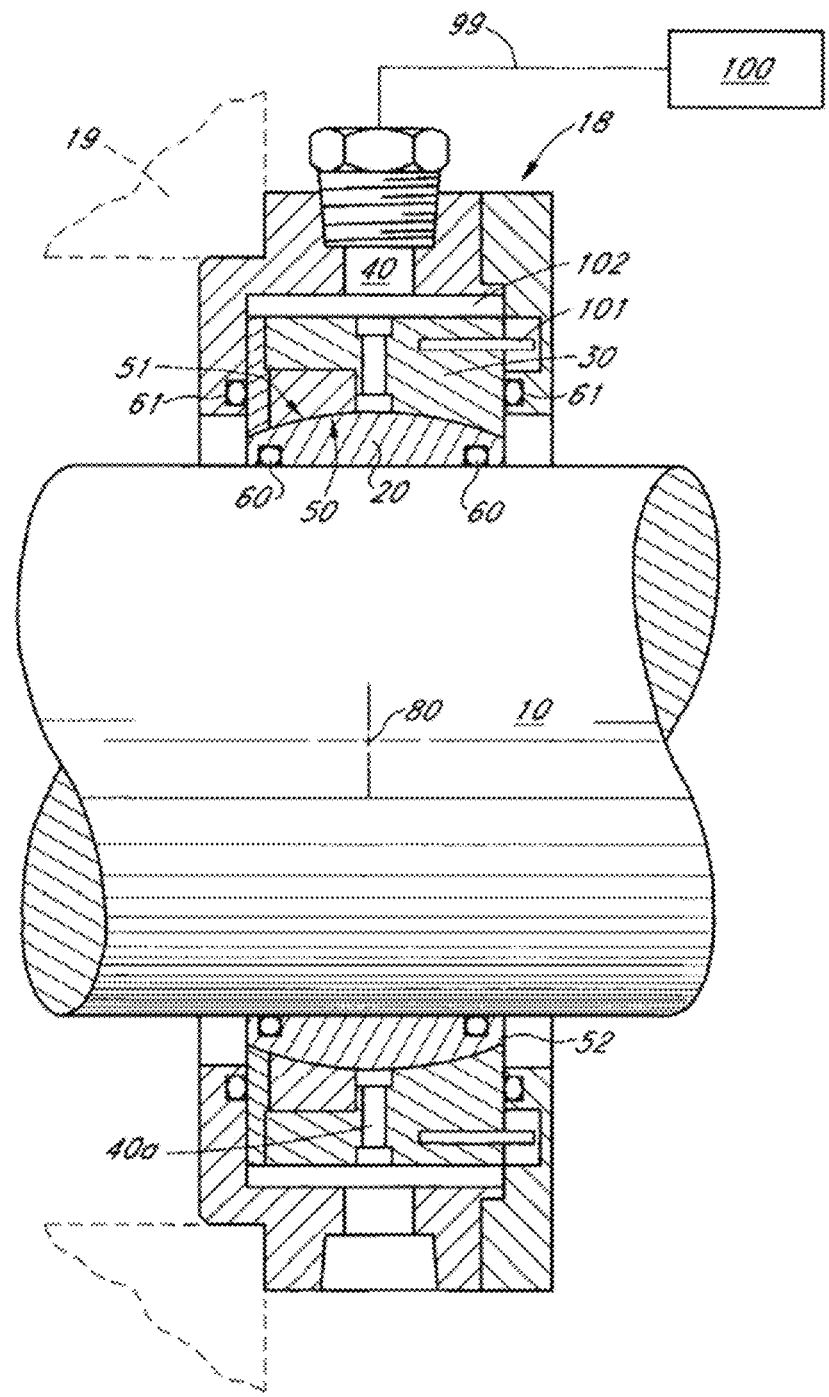
FIG. 13 is a cross-sectional view of another embodiment of a bearing isolator (or shaft seal assembly) configured with a rotor.

FIG. 13 shows another embodiment of a bearing isolator 18 (or shaft seal assembly) mounted adjacent a shaft 10. The shaft 10 may extend through the bearing isolator 18 and/or the housing 19. A source of gas or fluid, 100 which may include but is not limited water, gas, vapor and/or lubricant, may also be in communication with the bearing isolator 18 via conduit 99. The rotor 20 may be affixed to the shaft 10 by means by a frictional seal 60, which may be configured as one or more o-rings. The rotor 20 may be configured to follow the rotational movement of the shaft 10 because of the frictional engagement of the seals 60. The passages 40 and 40a may be configured as shown but will not be described in detail here because such description is already understood by those of ordinary skill in the art.

Figure 15:
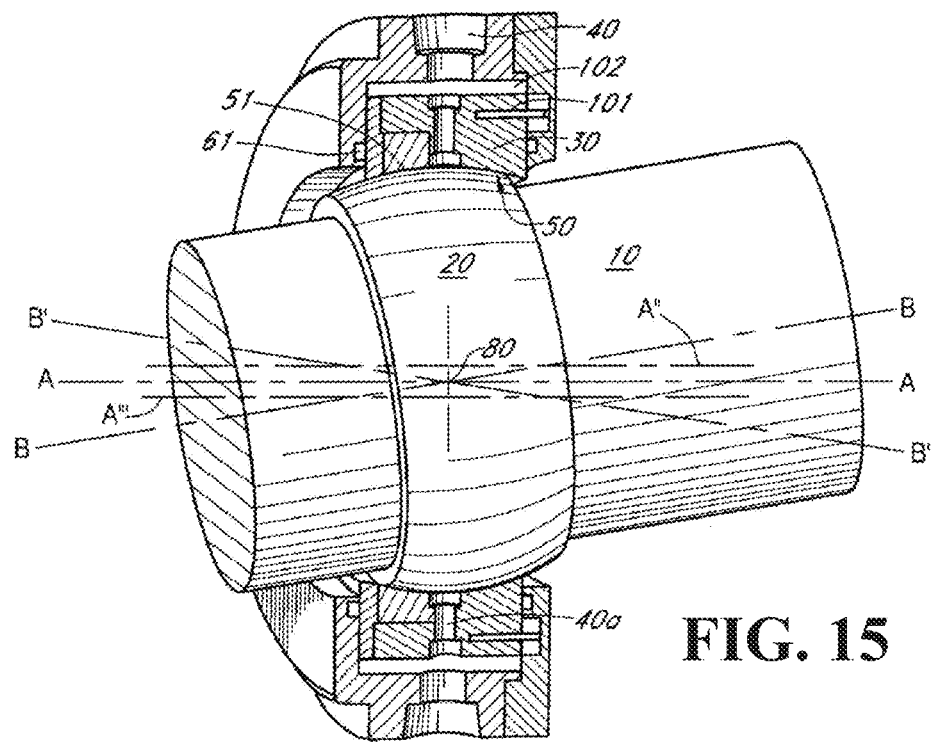
FIG. 15 is a partial cross-sectional view of the embodiment of a bearing isolator shown in FIG. 13 wherein the shaft is misaligned and/or radially displaced.

A pair of corresponding spherical surfaces 50 and 51 may be used to create a self-aligning radial clearance 52 between the rotor 20 and the stator 30 prior to, during, and after use. This clearance 52 may be maintained at a constant value even as the shaft 10 becomes misaligned during use. Various amounts and direction of misalignment between the centerline of the shaft 10 and the housing 19 are illustrated in FIGS. 15-17. An annular recess 102 between the stator 30 and fixed stator 31 may allow the bearing isolator 18 to accommodate a predetermined amount of radial shaft displacement.

In the embodiments shown herein, the spherical surfaces 50, 51 may have a center point identical from the axial faces of both the rotor and stator 20, 30, respectively. However, the spherical surfaces 50, 51 may be radially, and/or as shown, vertically spaced apart. These spherical surfaces 50, 51 may move radially in response to and/or in connection with and/or in concert with the radially positioning of other components of the bearing isolator 18. Typically, if the shaft 10 becomes misaligned with respect to the housing 19, the rotor 20 may consequently become misaligned with respect thereto, and then the spherical surfaces 50, 51 and/or the stator 30, moving radially within the annular recess of the fixed stator 31, may compensate for the misalignment.

Figure 15A:
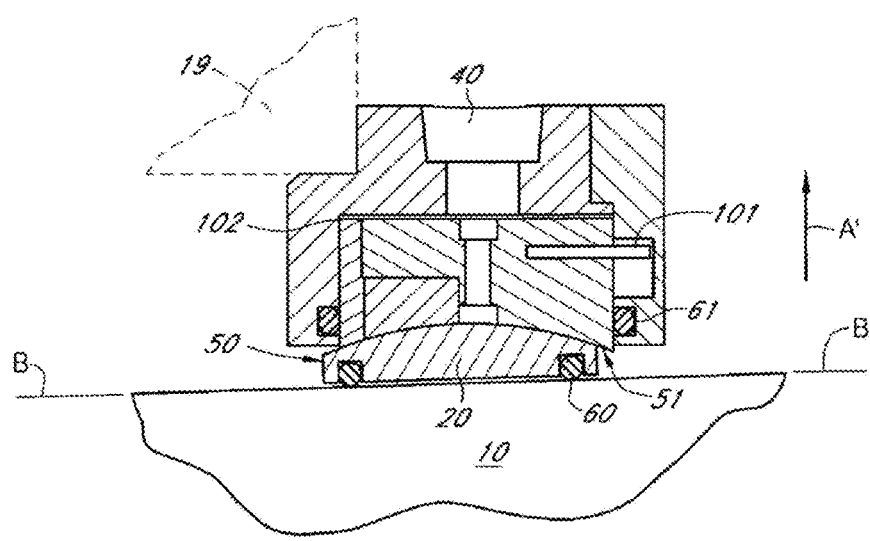
FIG. 15A is a detailed view of a portion of the embodiment bearing isolator shown in FIG. 15.

FIGS. 15 and 15A illustrate that in one embodiment of the bearing isolator 18, the rotor 20 may move with respect to the stator 30, 31 as shaft 10 is misaligned with respect to housing 19 through the interaction between spherical surfaces 50, 51. Such relative movement to help to ensure the distances between the center points of the rotor 20 and stator 30 and a fixed point on the housing 19 are constant or relatively constant during use.

Figure 14:
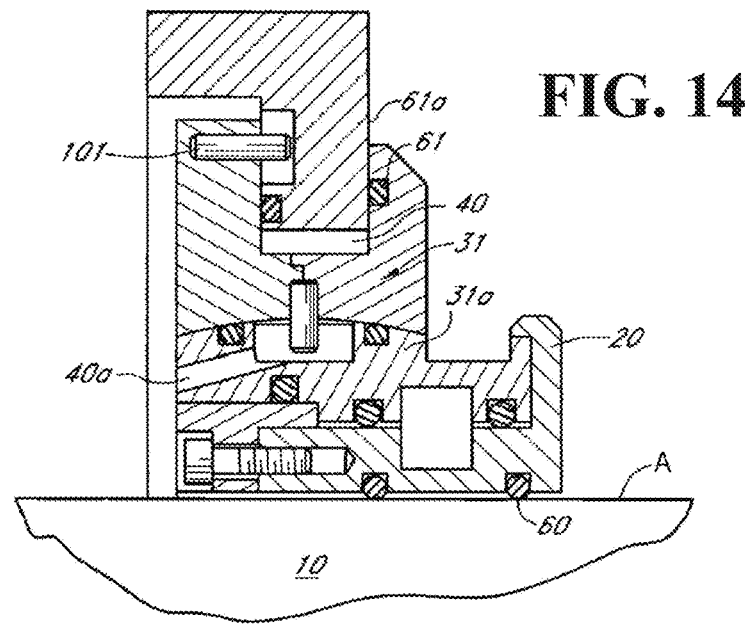
FIG. 14 is a cross-sectional view of a portion of yet another embodiment of a bearing isolator (or shaft seal assembly) configured with a rotor.
Figure 14A:
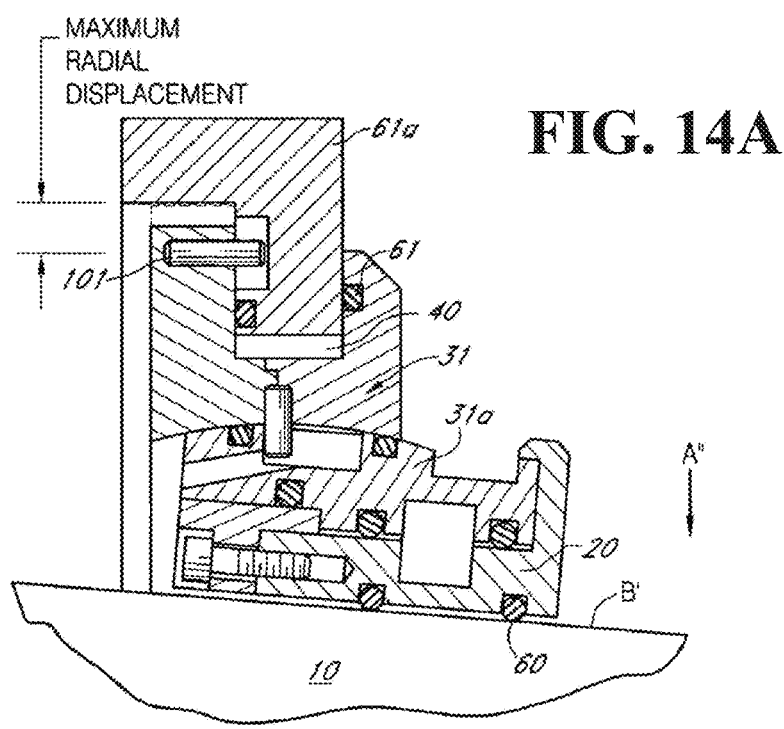
FIG. 14A is a cross-sectional view of the portion of the embodiment of a bearing isolator shown in FIG. 14 with the shaft misaligned and/or radially displaced.

In the embodiment of the bearing isolator 18 shown in FIGS. 14 and 14A, the spherical surfaces 50, 51 may be positioned on a fixed stator 31 and stator 31a, respectively, rather than on the rotor 20 and stator 30. Still referring to FIGS. 14 and 14A, this design may allow the rotor 20 and stator 31a to move with respect to the fixed stator 31, flange unit 61a, and/or housing 19. The rotor 20, stator 31a, and fixed stator 31 may move radially with respect to the flange unit 61a (and consequently with respect to the housing 19) as best shown in FIG. 14A. In this embodiment of the bearing isolator 18 there may be a very minimal amount of relative rotation between the spherical surfaces 50, 51.

The embodiment of the bearing isolator 18 shown in FIGS. 14 and 14A may provide for controlled radial movement of the fixed stator 31, stator 31a, and/or rotor 20 with respect to flange unit 61a, which flange unit 61a may be engaged with a housing 19. Rotational movement of the fixed stator 30 with respect to the flange unit 61a may be prevented by anti-rotational pins 101. The fixed stator 31 may be frictionally secured to the flange unit 61a using a frictional seal 61, which may be made of any material with sufficient elasticity and frictional characteristics to hold the fixed stator 31 in a fixed radial position with respect to the flange unit 61a but still be responsive to the radial forces when the shaft 10 is misaligned. Changes to the radial position of the fixed stator 31, stator 31a, and/or rotor 20 and the resulting positions thereof (as well as the resulting position of the interface between the fixed stator 31 and stator 31a) may occur until the radial force is fully accommodated or until the maximum radial displacement of the bearing isolator 18 is reached.

Referring now to FIGS. 15 and 15A, in operation the rotor 20 may be moved radially as the shaft 10 becomes misaligned with respect to the housing 19. Radial movement of the spherical surfaces 50, 51 between the stator 31a and fixed stator 31 may result from this pressure. FIG. 15 shows potential resultant radial movement of center point 80 as the shaft 10 is misaligned. During normal operation, the shaft 10 is typically horizontal with respect to the orientation shown in FIG. 15, as represented by line A. As the shaft 10 becomes misaligned in a manner represented by line B, the center point 80 may move to a point along line A". As the shaft 10 becomes misaligned in a manner represented by line B', the center point 80 may move to a point along line A'. However, in other shaft 10 misalignments, the radial positions of the rotor 20, stator 30, and/or fixed stator 31 may be constant and the spherical surfaces 50, 51 may compensate for the shaft 10 misalignment. From the preceding description it will be apparent that the bearing isolator 18 may provide a constant seal around the shaft 10 because the distance between the spherical surfaces 50, 51 may be maintained as a constant regardless of shaft 10 misalignment of a normal or design nature.

The physical dimensions of the spherical surfaces 50 and 51 may vary in linear value and in distance from the center point 80, depending on the specific application of the bearing isolator 18. These variations will be utilized to accommodate different sizes of shafts and seals and different amounts of misalignment, and therefore in no way limit the scope of the bearing isolator 18 as disclosed herein. Additionally, and suitable structure and/or method for engaging various elements with one another either rotationally, fixedly, or with various degrees of freedom of motion therebetween may be used with the shaft seal assembly 18 without limitation, including but not limited to screws, bolts, pins, chemical adhesives, interference fits, and/or combinations thereof.

ELEMENT LISTING (FIGS. 16-21B)

| Description | Element No. |
| --- | --- |
| Shaft seal assembly | 10 |
| Shaft | 12 |
| Fastener | 14 |
| Fixed stator | 20 |
| Fixed stator seal groove | 20a |
| Main body | 21 |
| Face plate | 22 |
| Face plate pin recess | 22a |
| Face plate seal groove | 22b |
| Inlet | 24 |
| Annular recess | 26 |
| Seal | 28 |
| Floating stator | 30 |
| Floating stator seal groove | 30a |
| Radial exterior surface | 32 |
| First pin recess | 33 |
| Pin | 34 |
| Second pin recess | 35 |
| Second pin recess enlarged portion | 35a |
| Floating stator annular groove | 37 |
| Concave surface | 38 |
| Sealing member | 40 |
| Recess | 42 |
| Radial bore | 44 |

-continued

| Description | Element No. |
|---|---|
| Radial bore inlet | 44a |
| Radial bore outlet | 44b |
| Radial interior surface | 46 |
| Convex surface | 48 |
| Seal assembly | 100 |
| O-ring | 102 |
| Fastener | 104 |
| Receiver | 105 |
| Aperture | 106 |
| Pin | 108 |
| First stator | 110 |
| Upper portion | 110a |
| Lower portion | 110b |
| Annular recess | 111 |
| Concave surface | 112 |
| Shelf | 112a |
| Slot | 113 |
| Inner member | 114 |
| Inlet | 114a |
| Outer member | 116 |
| First stator pin recess | 116a |
| Second stator | 120 |
| Second stator annular recess | 121 |
| Main body | 122 |
| Convex surface | 122a |
| Convex surface shelf | 122b |
| Second stator pin recess | 123 |
| Second stator inlet | 124 |
| Internal channel | 125 |
| Main body shelf | 126 |
| Axial recess | 127 |
| Access plate | 128 |
| Shoulder | 128a |
| Axial bore | 128b |
| Annular space | 129 |
| Throttle member | 130 |
| Throttle member annular recess | 131 |
| First wall | 132 |
| First wall axial projection | 132a |
| Intermediate portion | 133 |
| Radial channel | 133a |
| Second wall | 134 |
| Axial projection | 134a |
| Throttle member channel | 136 |

Figure 16A:
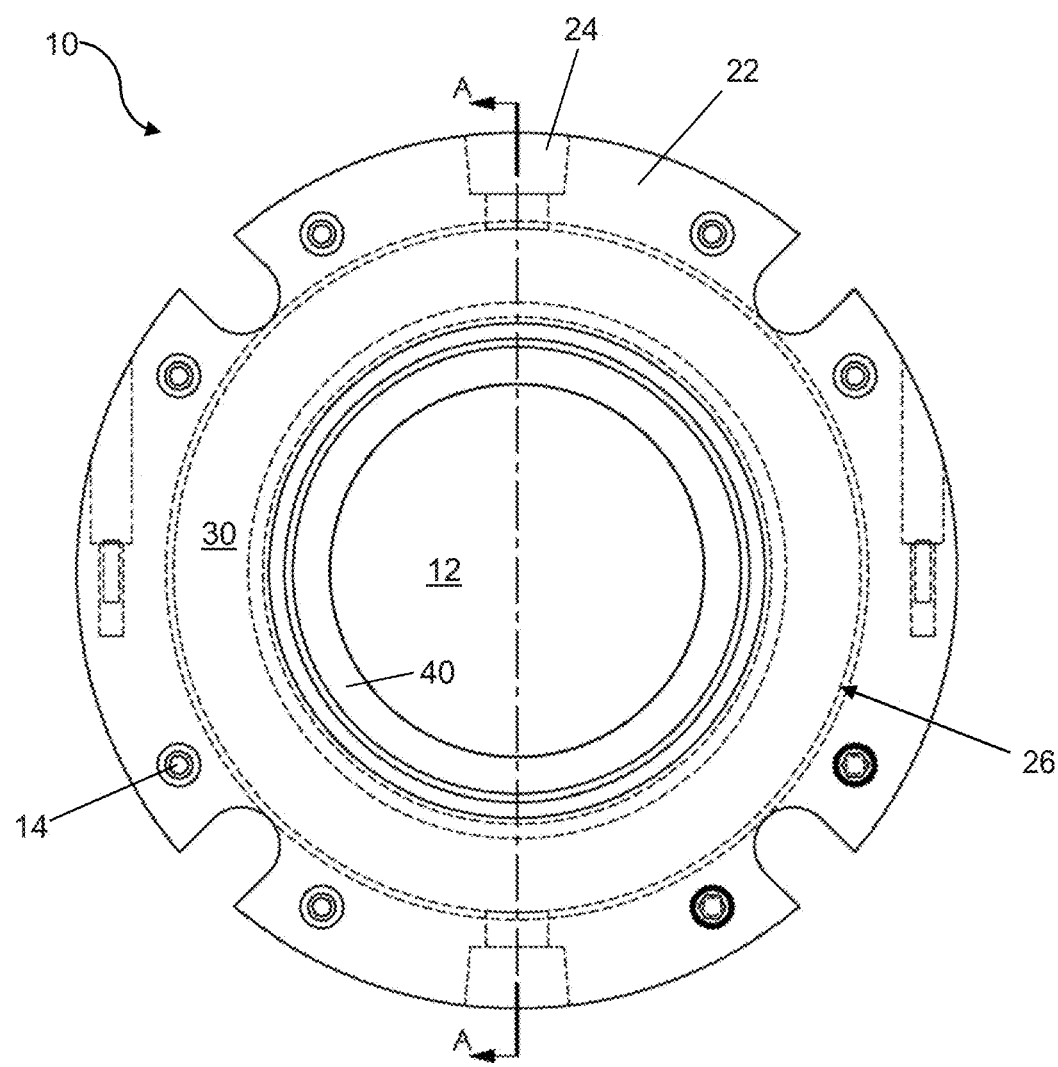
FIG. 16A is an exterior face view of an illustrative embodiment of a multi-hole shaft seal assembly, wherein certain hidden surfaces are shown with broken lines.
Figure 16B:
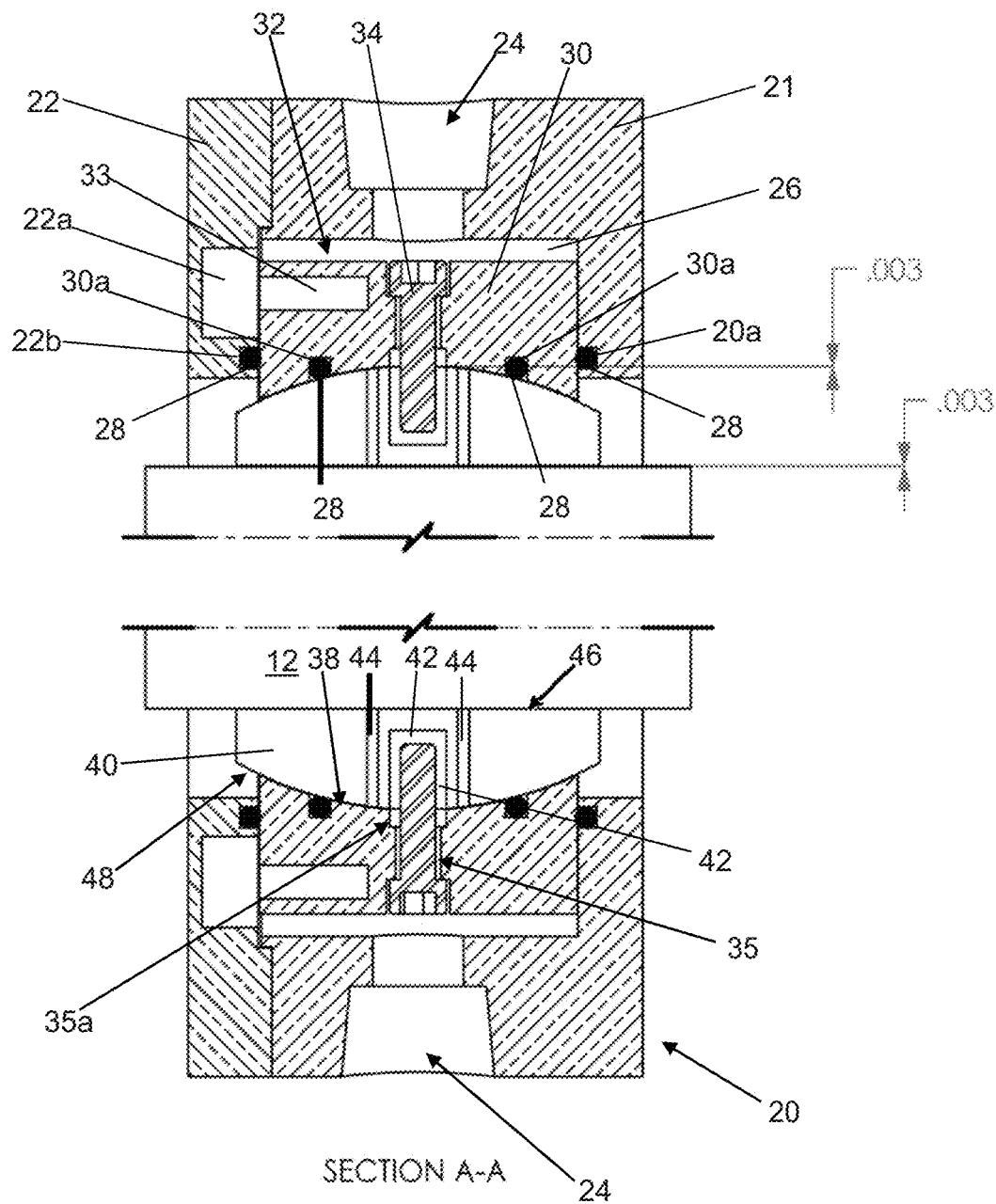
FIG. 16B is a cross-sectional view of the embodiment of a multi-hole shaft seal assembly shown in FIG. 16A along line A-A.

Another embodiment of a shaft seal assembly 10 is shown in FIGS. 16A & 16B. This embodiment is similar to the embodiment of the shaft seal assembly 25 described above and shown in FIGS. 1-12. The shaft seal assembly 10 may include a fixed stator 20, floating stator 30, and a sealing member 40, as shown. In the pictured embodiment, the sealing member 40 may be positioned adjacent a shaft 12 that is rotatable with respect to the shaft seal assembly 10 and/or housing. Accordingly, a rotational interface may exist between a radial interior surface 46 of the sealing member 40 positioned adjacent the shaft 12 and an exterior portion of the shaft 12. In other embodiments of the shaft seal assembly 10 not pictured herein, the sealing member 40 may be engaged with the shaft 12 such that it rotates therewith (e.g., the shaft seal assembly 10 may be configured with a rotor). In such an embodiment, a rotational interface may exist between a concave surface 38 of the floating stator 30 and a convex surface 48 of the sealing member 40. Accordingly, the scope of the shaft seal assembly 10 as disclosed herein extends to shaft seal assemblies 10 in which the sealing member 40 does or does not rotate with a shaft 12.

The embodiment of the shaft seal assembly 10 shown in FIGS. 16A & 16B may include a fixed stator 20 that may be securely mounted to a housing (not shown in FIGS. 16A & 16B) by any suitable methods and/or structure. The fixed stator 20 may include a main body 21 and a face plate 22 that may be engaged with one another via one or more fasteners 14. It is contemplated that a fixed stator 20 formed with a main body 21 and face plate 22 may facilitate ease of installation of the shaft seal assembly 10 in certain applications. In such applications, the main body 21 may be affixed to the housing, the sealing member 40 and floating stator 30 may be positioned appropriately, and then the face plate 22 may be secured to the main body 21. However, the scope of the present disclosure is in no way limited by the specific mounting and/or installation method of the shaft seal assembly 10.

The fixed stator 20 may be formed with an annular recess 26 into which a portion of the floating stator 30 and/or sealing member 40 may be positioned. A predetermined clearance between the radial exterior surface 32 of the floating stator 30 (as well as the axial exterior surfaces thereof) and the interior surfaces of the annular recess 26 may be selected to allow for a predetermined amount of relative radial and/or axial movement between the fixed stator 20 and floating stator 30. At least one pin 34 (which may be radially oriented as in the embodiment shown in FIGS. 16A & 16B) may be engaged with the floating stator 30 at a second pin recess 35, and a portion of the pin 34 may extend into a recess 42 formed in the sealing member 40. Additionally, other pins (not shown, but which may be axially oriented) also may be engaged with the floating stator about a first pin recess 33, and a portion of that pin may extend into a face plate pin recess 22a. In the illustrative embodiment shown in FIGS. 16A & 16B, the pins 35 may mitigate relative rotation between the floating stator 30 and the sealing member 40. Axially oriented pins (not shown) may mitigate relative rotation between the floating stator 30 and the fixed stator 20. The axial interfaces between the floating stator 30 and fixed stator 20 may be sealed with seals 28, which seals 28 may be positioned in fixed stator seal grooves 20a and/or face plate seal grooves 22b. The seals 28 may be configured as o-rings, but may be differently configured in other embodiments of the shaft seal assembly 10 without limitation.

The floating stator 30 may also be formed with a concave surface 38 in a radial interior portion thereof. This concave surface 38 may form a semi-spherical interface with a corresponding convex surface 48 formed in the radial exterior portion of the sealing member 40. Accordingly, the shaft seal assembly 10 shown in FIGS. 16A & 16B may accommodate shaft 12 misalignment, shaft 12 radial movement, and shaft 12 axial movement with respect to the shaft seal assembly 10 and/or equipment housing in an identical and/or similar manner to that previously described for the shaft seal assemblies 25 shown in FIGS. 1-12.

The illustrative embodiment of the shaft seal assembly 10 also may include various fluid conduits for applying a sealing fluid to the shaft seal assembly 10. The fixed stator 20 may be formed with one or more inlets 24 for introduction of a sealing fluid to the shaft seal assembly 10. The inlet 24 may be in fluid communication with the annular recess 26 formed in the fixed stator 20, which annular recess 26 may be in fluid communication with one or more radial passages (not shown) formed in the floating stator 30 and extending from the radial exterior surface 32 thereof to the concave surface 38 thereof. Alternatively, or in addition to the one or more radial passages, the second pin recess 35 formed in the floating stator 30 may be configured to allow a specific amount of sealing fluid to traverse the length of the second pin recess 35 in a radially inward direction. The radially interior terminus of the second pin recess 35 may be formed with a second pin recess enlarged portion 35a. Alternatively, the floating stator 30 may be formed with a floating stator annular groove 37 on the concave surface 38 thereof. These radial passages, second pin recess 35, second pin recess enlarged portion 35a, and/or floating stator annular groove 37 may serve as a conduit for sealing fluid from the annular recess 26 of the fixed stator 20 to the convex surface 48 of the sealing member 40. Accordingly, the scope of the shaft seal assembly 10 is not limited by the specific combinations of fluid conduits disclosed herein, but extends to all configurations of fluid conduits that may supply a sealing fluid to the sealing member 40.

The fixed stator 20 and/or seals 28 between the fixed stator 20 and floating stator 30 may be configured so that the majority of sealing fluid introduced to the inlet 24 passes through the floating stator 30 (by any fluid conduit configuration, as explained above) in a radially inward direction. The semi-spherical interface between the floating stator 30 concave surface 38 and the sealing member 40 convex surface 48 may be sealed with seals 28, which seals 28 may be positioned in floating stator seal grooves 30a and/or sealing member seal grooves (not shown). The seals 28 may be configured as o-rings, but any suitable structure and/or method may be used without limitation. The floating stator 30, sealing member 40, and/or seals 28 therebetween may be configured so that the majority of sealing fluid exiting the floating stator 30 passes through the sealing member 40 through a plurality of radial bores 44 in a direction from the convex surface 48 of the sealing member 40 to the radial interior surface 46 thereof (i.e., in a generally radially inward direction, such that the sealing fluid exits the shaft seal assembly 10 adjacent the shaft 12).

Figure 17A:
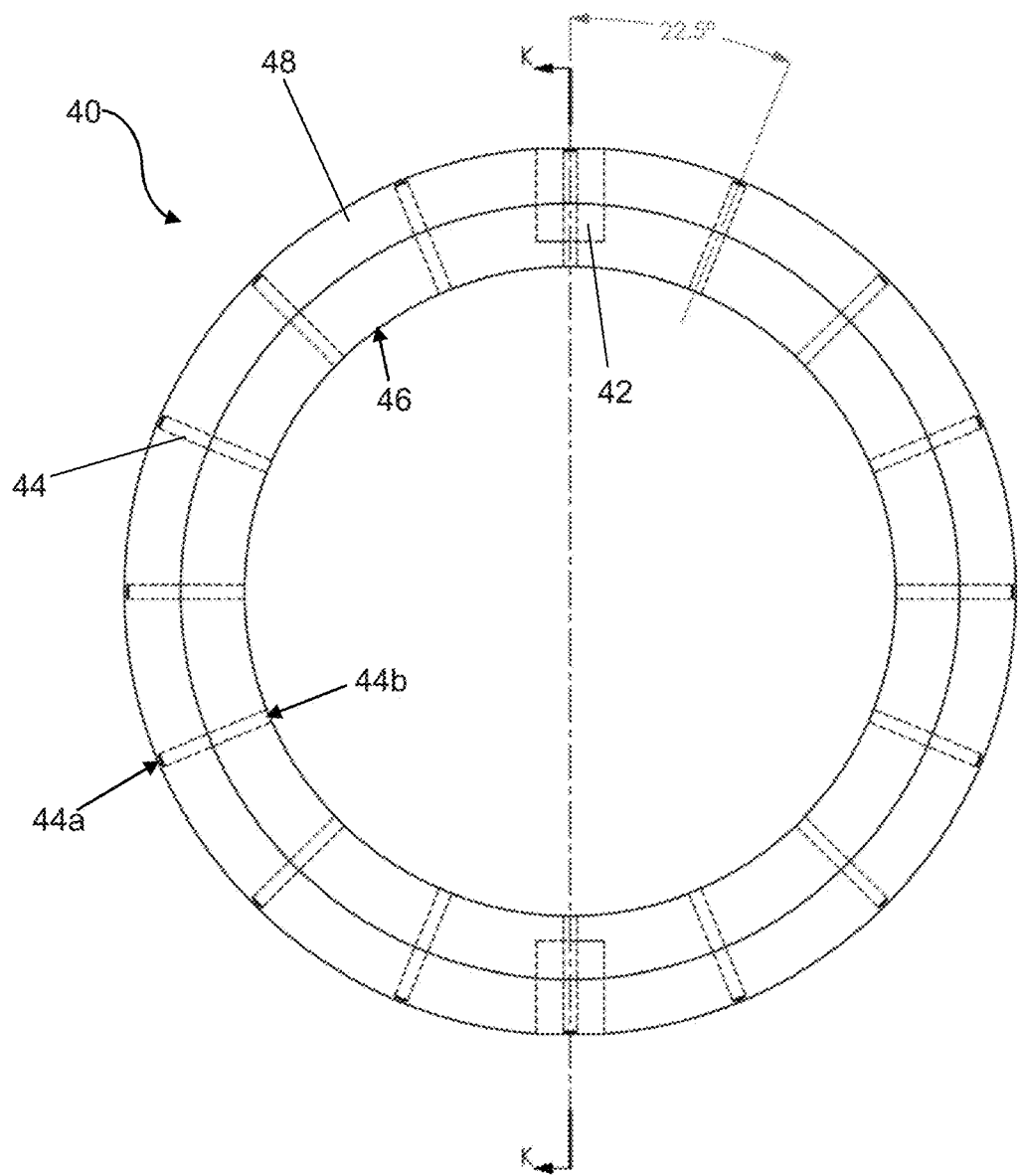
FIG. 17A is an exterior face view of one embodiment of a sealing member that may be used with various embodiments of a multi-hole shaft seal assembly.
Figure 17B:
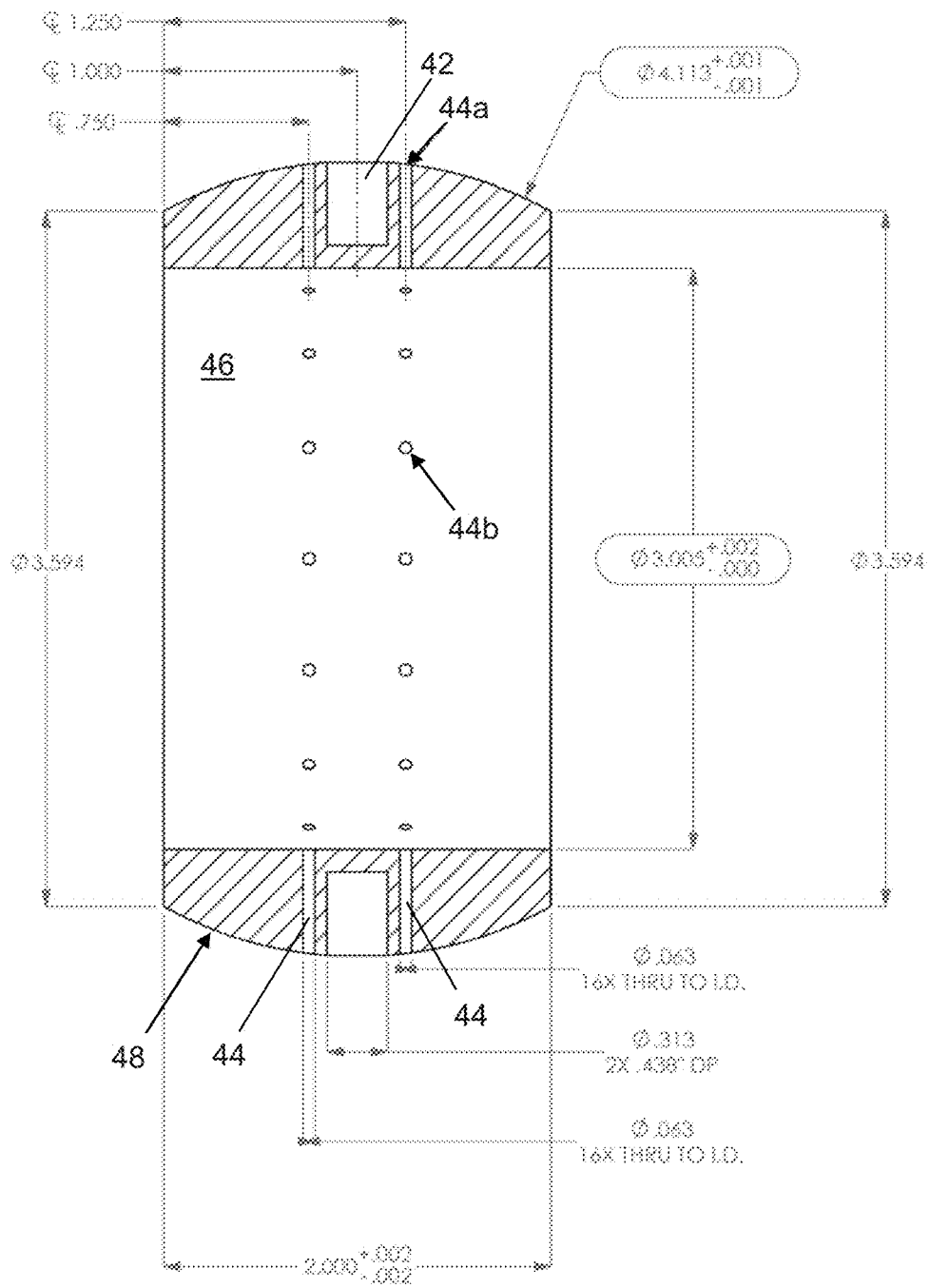
FIG. 17B is a cross-sectional view of the embodiment of a sealing member shown in FIG. 17A along line K-K.

The fixed stator 20, floating stator 30, and/or sealing member 40 may be configured such that the fluid conduits formed therein allow the majority sealing fluid to exit the shaft seal assembly 10 from an area between the sealing member 40 and shaft 12 at a predetermined rate for a given set of operation parameters (e.g., sealing fluid viscosity, pressure, and/or volumetric flow rate, shaft 10 rpm, etc.). The illustrative embodiment of the shaft seal assembly 10 may be formed with thirty two (32) radial bores 44 in the sealing member 40 in corresponding pairs equally spaced about the circumference of the sealing member, which is best shown in FIGS. 17A & 17B. Each radial bore 44 may be formed with a radial bore inlet 44a adjacent the convex surface 48 and a radial bore outlet 44b adjacent the radial interior surface 46. However, in other embodiments of the sealing member 40 not shown herein, the sealing member 40 may be configured with differently configured radial bores 44, different numbers of radial bores 44, and/or different relative positions of radial bores 44 without limitation.

It is contemplated that the configuration of radial bores 44 shown in the embodiment of a sealing member 40 pictured in FIGS. 17A and 17B may be more efficient than other configurations in that a lower volumetric flow rate of sealing fluid may be required for a given set of operational parameters when compared to the prior art. Additionally, the smooth, generally cylindrical configuration of the radial interior surface 46 may create a pressurized fluid barrier between the shaft 12 and the sealing member 40 at the interface thereof (e.g., a "lift-off" seal). This may lead to a nearly frictionless shaft seal assembly 10 with no and/or minimal contact between the shaft 12 and the sealing member 40 during operation. However, in other embodiments, different numbers, spacing, and/or configurations of the fluid conduits in the fixed stator 20, floating stator 30, and/or sealing member 40 may be used without departing from the spirit and scope of the shaft seal assembly 10 as disclosed and claimed herein.

In light of the present disclosure, it will be apparent to those skilled in the art that the configuration of fluid conduits disclosed herein may be adapted to create a pressurized fluid barrier between any interface at which two elements are rotating with respect to one another, such as the articulated seal disclosed in U.S. Pat. Nos. 7,090,403, 7,090,403 is incorporated by reference herein in its entirety, and discloses embodiments of a shaft seal assembly having a spherical rotational interface between a rotor and a floating stator (such as those shown in FIGS. 13, 15, and 15A) and embodiments of a shaft seal assembly having a generally non-rotating spherical interface between two portions of a stator (such as those shown in FIGS. 14 and 14A). Accordingly, the scope of the shaft seal assembly 10 as disclosed herein is not limited by the location and/or type of rotational interface the shaft seal assembly 10 is configured to accommodate.

For example, in an embodiment not pictured herein, the stator 30 of an embodiment similar to that shown in FIGS. 13, 15, and 15A may be configured with one or more generally narrow diameter radial bores (which may be generally similar to those shown in the embodiment in FIGS. 17A and 17B). Those radial bores may be configured so as to provide fluid from an external source (which may be in fluid communication with passage 40) to the interface between spherical surfaces on the stator portions 31, 31a (which may be configured as a concave surface on stator 31 and a convex surface on stator 31a). Alternatively, the stator 31 may be configured with radial bores that serve to provide fluid from an external source (which may be in fluid communication with passage 40) to the interface between stator 31a and rotor 20, which may be a rotational interface having a labyrinth seal pattern and/or one or more seals (which may be configured as o-rings) therein.

FURTHER EMBODIMENTS OF A SHAFT SEAL ASSEMBLY

Referring now to FIGS. 18-21B, other features and components in various illustrative embodiments of a generally ring-shaped seal assembly 100 having a central bore are shown therein. Generally, these illustrative embodiments of a seal assembly 100 may provide all or some of the various advantages of the shaft seal assemblies 10 and bearing isolators 18 disclosed herein in addition to one or more advantages unique to the shaft seal assemblies 100 shown in FIGS. 18-21B without limitation unless otherwise indicated in the following claims. Generally, the seal assembly 100 may accommodate misalignment of a shaft 12 with respect to a housing (not shown) and/or the seal assembly 100 via a semispherical interface between the first stator 110 and second stator 120, shaft 12 movement in the radial dimension with respect to a housing and/or the first and second stators 110,120 via movement of a throttle member 130 in the radial dimension with respect to the first and second stators 110,120, and/or shaft 12 movement in the axial dimension with respect to a housing and/or the seal assembly 100 via a circumferential clearance and/or gap between an interior surface of the throttle member 130 and an exterior surface of the shaft 12 without limitation unless otherwise indicated in the following claims.

The seal assembly 100 shown in FIGS. 18-21B may be engaged with an equipment housing (not shown), and a shaft 12 may extend from and rotate with respect to the equipment housing. The seal assembly 100 may be engaged with the equipment housing via one or more mechanical fasteners 14, but any suitable method and/or apparatus (e.g., welding, chemical adhesives, interference fit, etc.) may be used to adequately engage the seal assembly 100 with an equipment housing without limitation unless otherwise indicated in the following claims.

Figure 18:
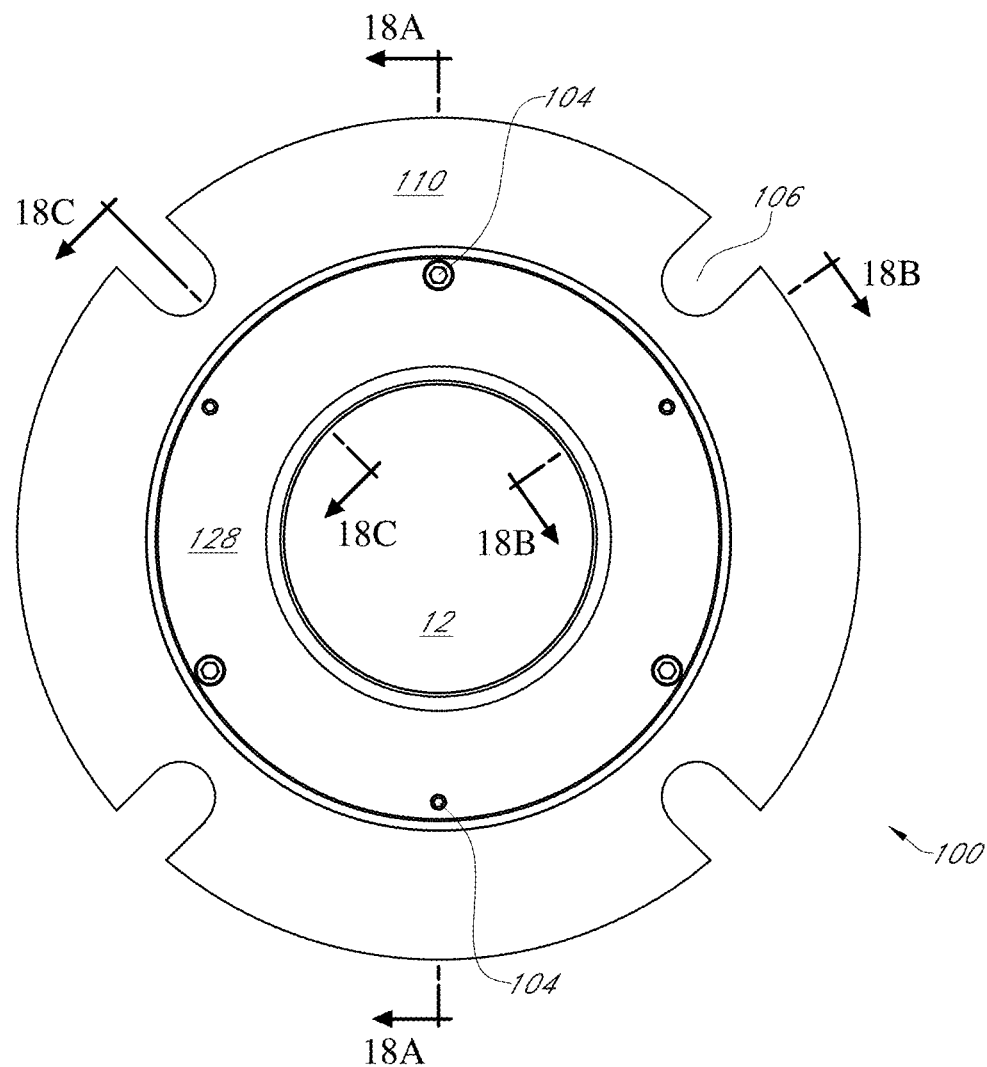
FIG. 18 is a plane front view of another illustrative embodiment of a shaft seal assembly.
Figure 18A:
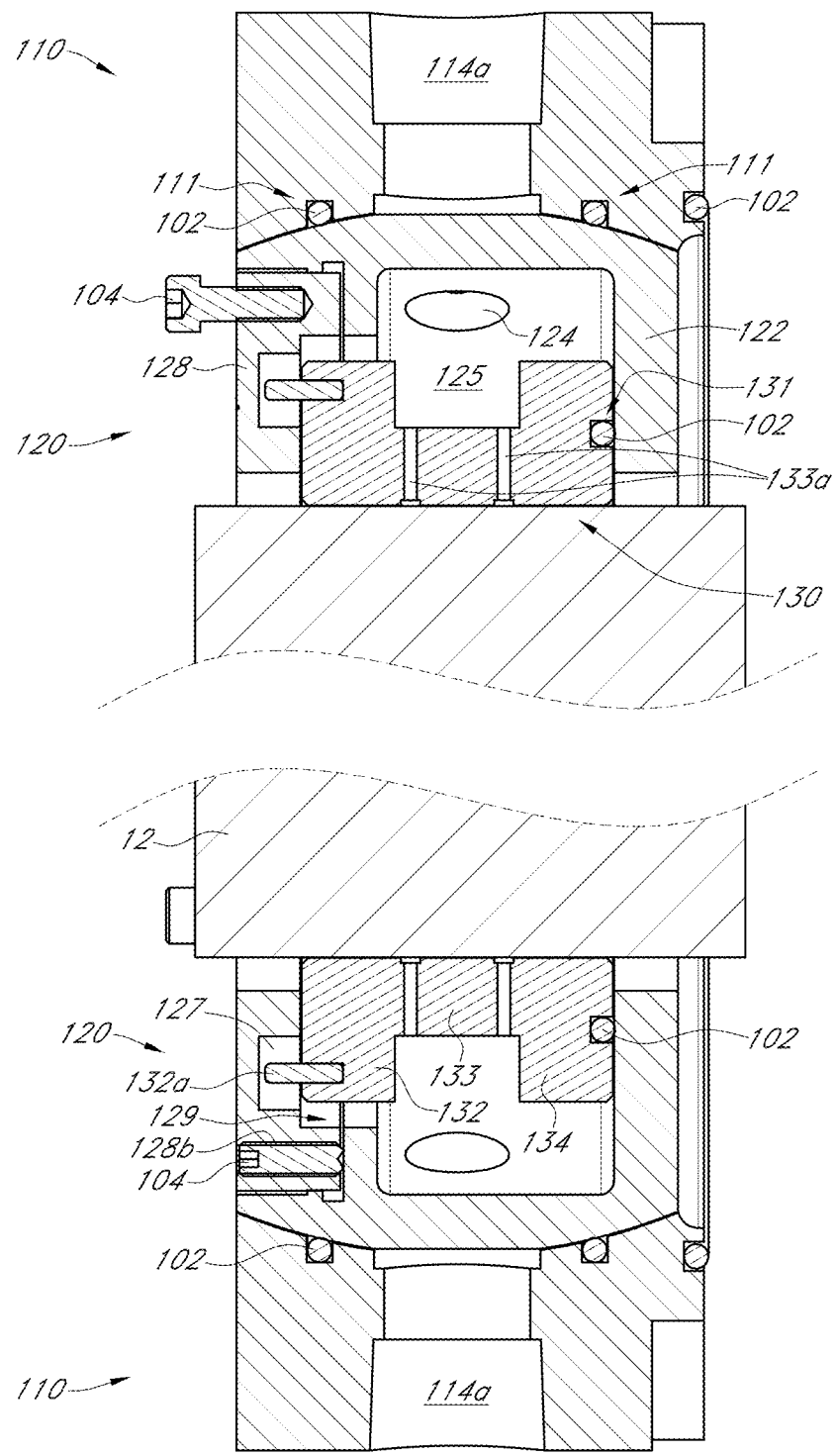
FIG. 18A is a cross-sectional view of the illustrative embodiment of a shaft seal assembly of FIG. 18 along line A-A.
Figure 18B:
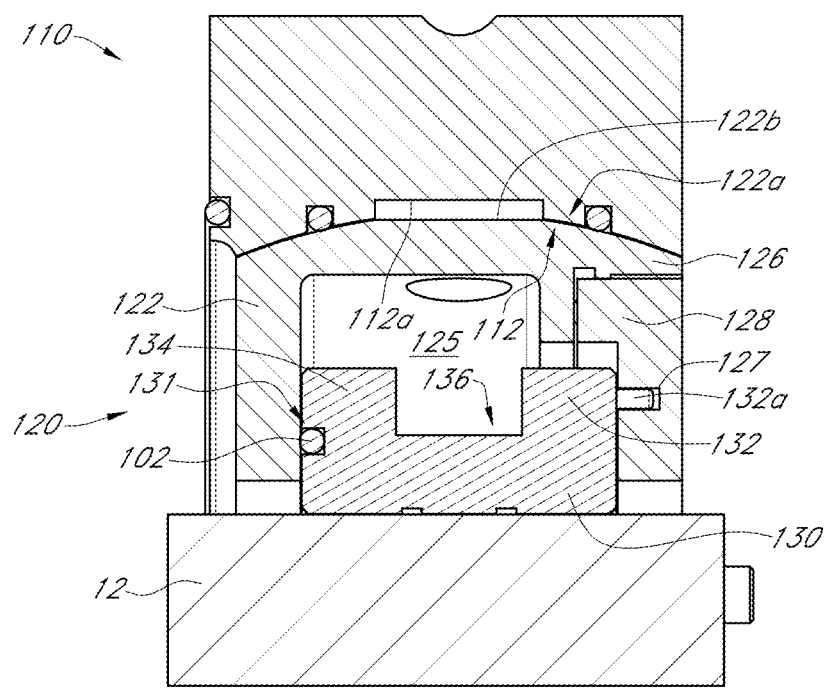
FIG. 18B is a cross-sectional view of the illustrative embodiment of a shaft seal assembly of FIG. 18 along line B-B.
Figure 18C:
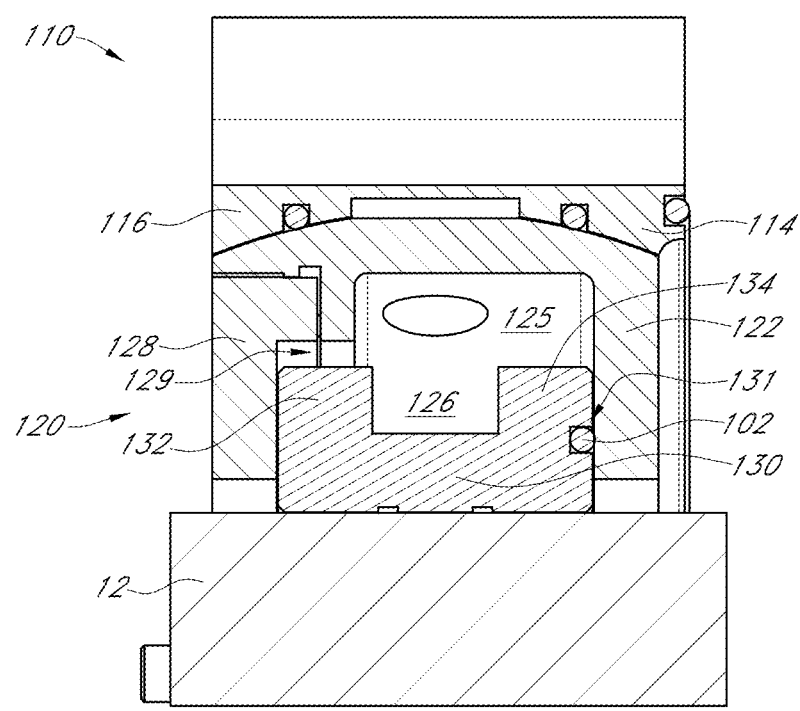
FIG. 18C is a cross-sectional view of the illustrative embodiment of a shaft seal assembly of FIG. 18 along line C-C.
Figure 19:
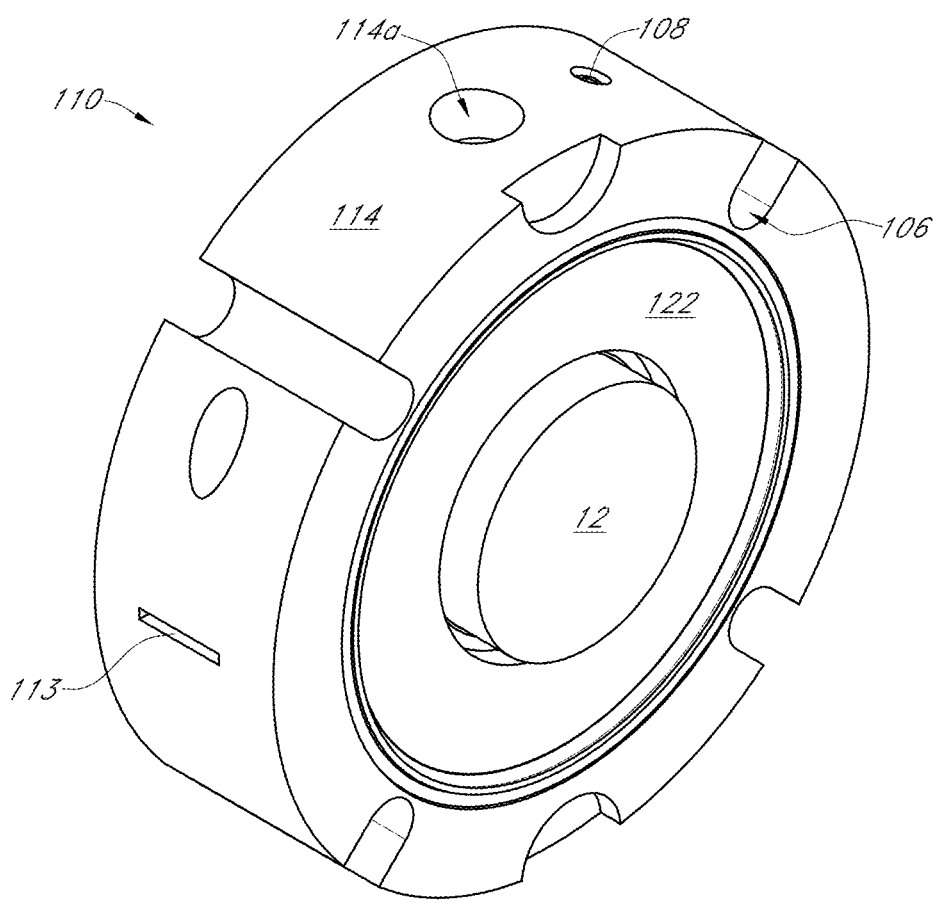
FIG. 19 is a perspective view of the shaft seal assembly shown in FIGS. 18-18C.
Figure 19A:
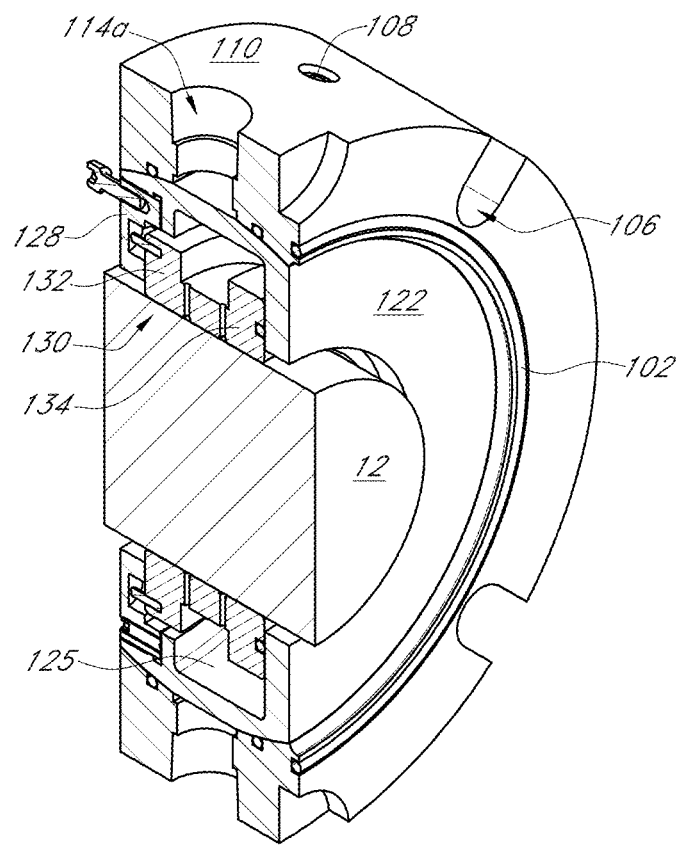
FIG. 19A is a perspective cross-sectional view of the shaft seal assembly shown in FIGS. 18-19.
Figure 19B:
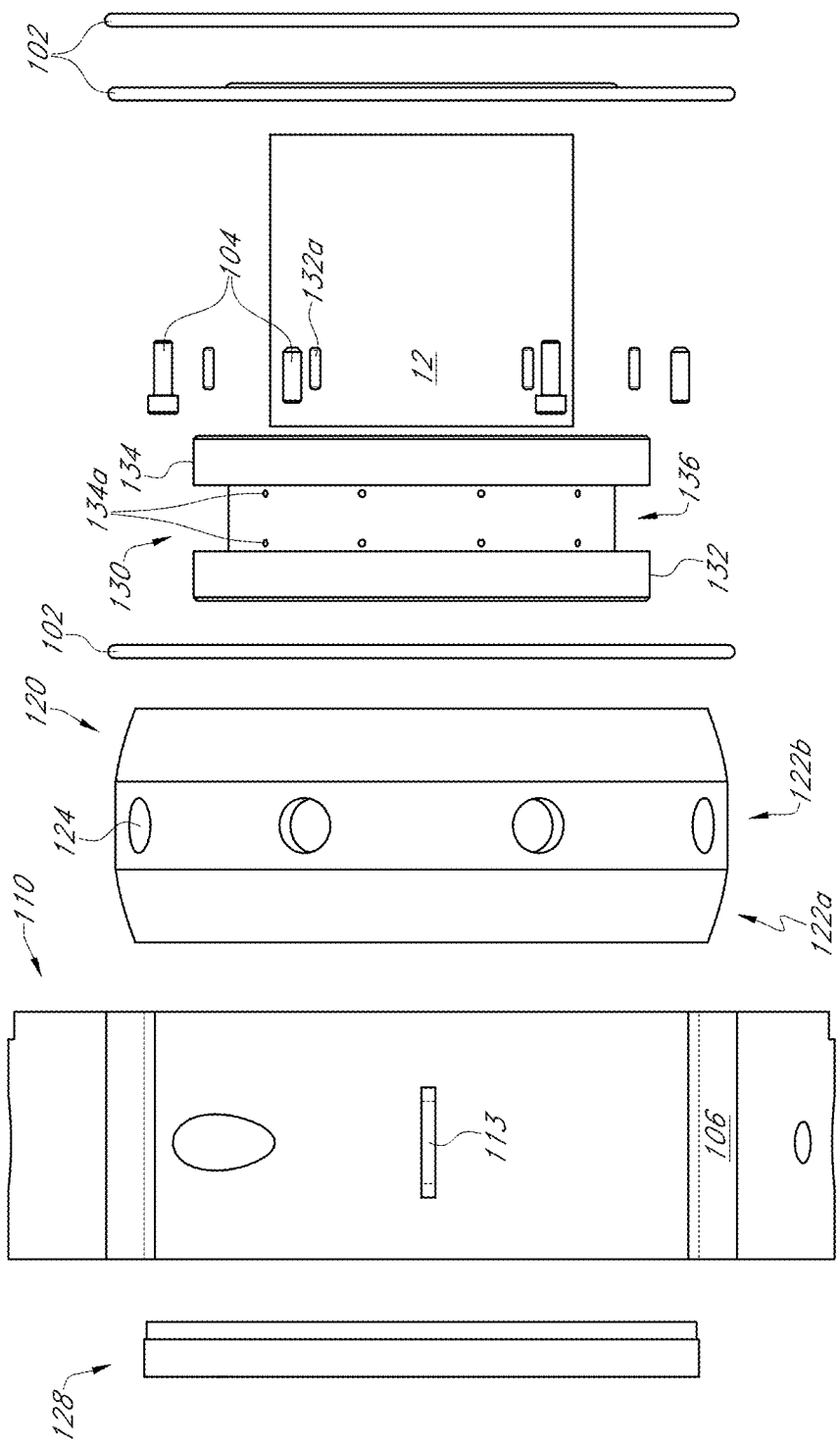
FIG. 19B is a side, exploded view of the shaft seal assembly shown in FIGS. 18-19A.
Figure 19C:
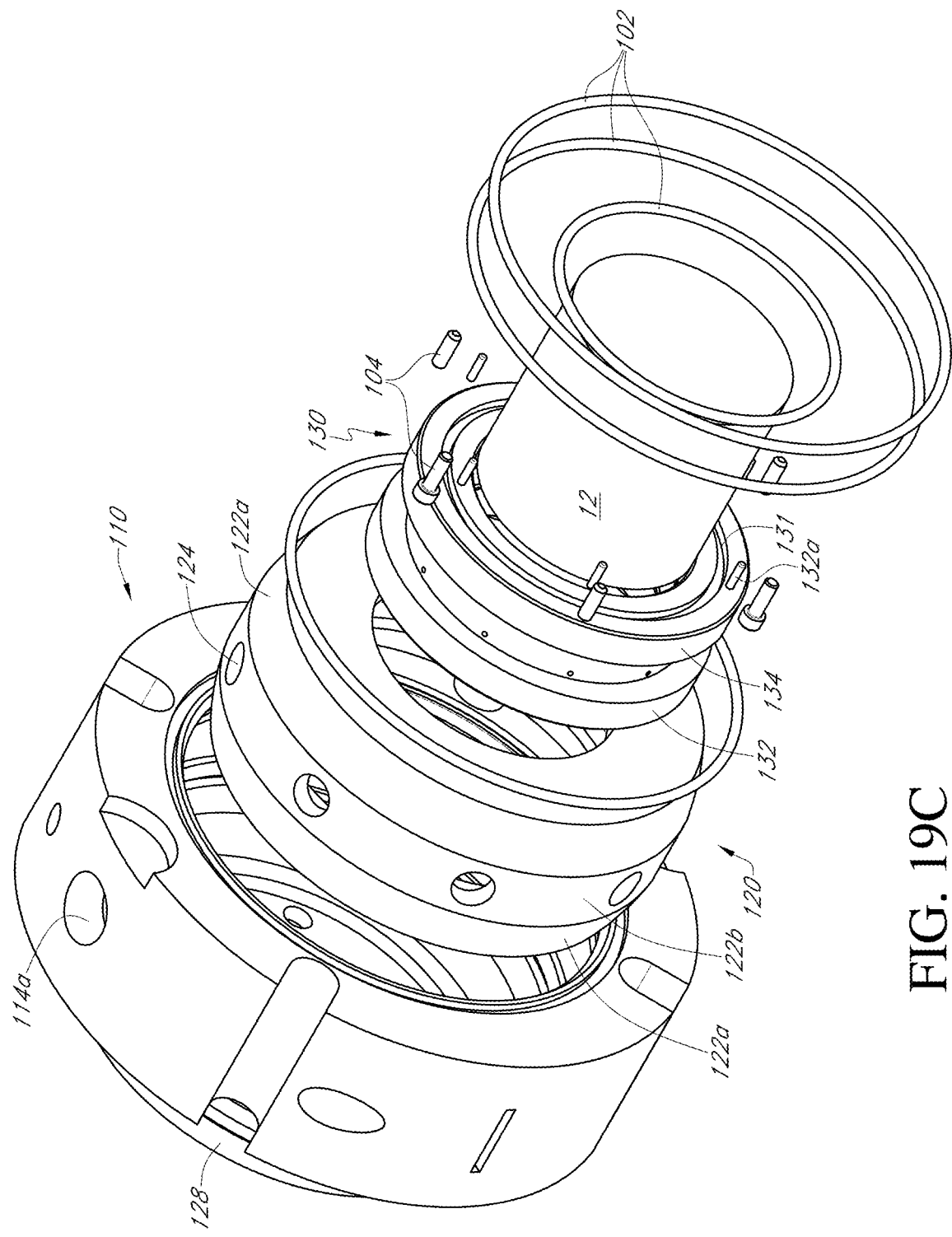
FIG. 19C is a perspective, exploded view of the shaft seal assembly shown in FIGS. 18-19B with the inboard side in the foreground.
Figure 19D:
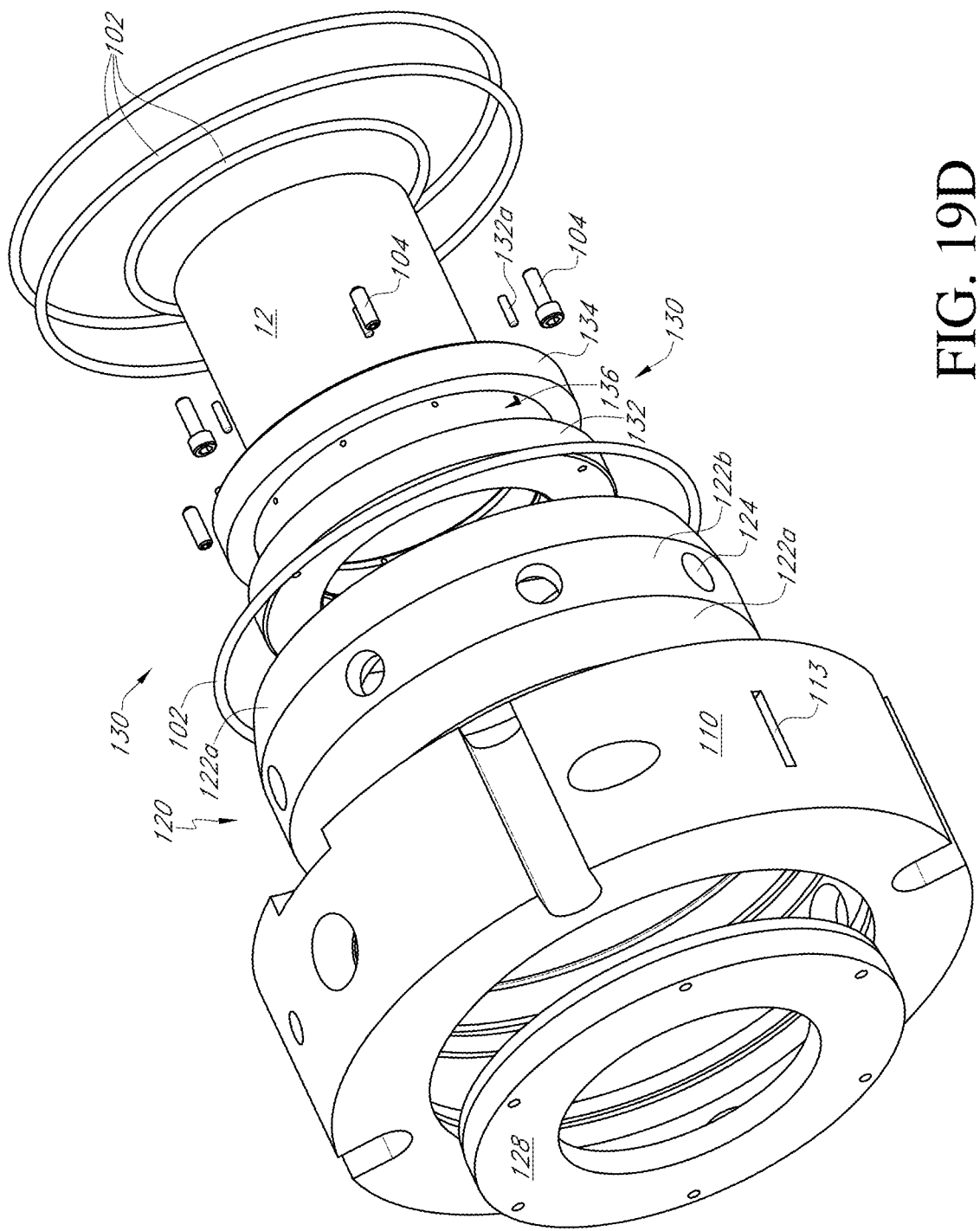
FIG. 19D is another perspective, exploded view of the shaft seal assembly shown in FIGS. 18-19C with the outboard side in the foreground.

The seal assembly 100 may include a first stator 110, a second stator 120, and a throttle member 130. Referring specifically to FIGS. 18A-18C, which provide cross-sectional views of the seal assembly 100 along various lines shown in FIG. 18, it is contemplated that the seal assembly 100 may be configured such that the inboard side (or product side) thereof is generally on the right side of FIGS. 18A and 18C and generally on the left side of FIG. 18B, and the outboard side thereof is generally on the left side of those FIGS. 18A and 18C and generally on the right side of FIG. 18B without limitation unless otherwise indicated in the following claims. The axial face of the seal assembly 100 shown in FIGS. 19 & 19A is generally the inboard side, whereas the right side of FIG. 19B is generally the inboard side and the left side thereof is generally the outboard side without limitation unless otherwise indicated in the following claims. Exploded, perspective views of the seal assembly 100 shown in FIGS. 19C and 19D are shown from opposite sides of the seal assembly 100, wherein FIG. 19C is shown generally from the inboard side whereas FIG. 19D is shown generally from the outboard side without limitation unless otherwise indicated in the following claims.

The first stator 110 may be formed with an inlet 114a to which a sealing fluid may be provided. The terminal end of the inlet 114a adjacent the second stator 120 may be formed as or positioned adjacent a shelf 112a in the concave surface 112 of the first stator 110, as described in further detail below. Additionally, the first stator 110 may be formed with an annular recess 111 on an inboard face thereof into which an O-ring 102 may be positioned. It is contemplated that the O-ring 102 may adequately seal the inboard side of the first stator 110 to the equipment housing in order to mitigate or prevent ingress of substances toward a product adjacent an equipment housing and egress of a product at the interface of the seal assembly 100 and equipment housing. However, any suitable structure and/or method may be used to achieve the desired seal between the seal assembly 100 and equipment housing (e.g., other mechanical sealing devices, chemical seals, combinations thereof, etc.) without limitation unless otherwise indicated in the following claims.

It is contemplated that the for many applications it may be advantageous to pressurize the sealing fluid in a manner as previously described above for other shaft seal assemblies 10 and/or bearing isolators 18. A sealing fluid may comprise a liquid, a vapor, a gas, and/or combinations thereof without limitation unless otherwise indicated in the following claims. The optimal sealing fluid and pressure thereof will vary from one application of the seal assembly 100 to the next and may be dependent at least upon the compatibility of the sealing fluid with other system components, including but not limited to a product adjacent an equipment housing to which the seal assembly 100 is engaged. It is contemplated that for certain applications air, nitrogen, water, and/or steam may be suitable sealing fluids. Accordingly, the phase, chemical composition, characteristics, configuration, etc. of the sealing fluid is therefore in no way limiting to the scope of the present disclosure unless otherwise indicated in the following claims.

The first stator 110 may be formed with one or more pin recesses 116a, and a pin 108 may be inserted into the pin recess 116a. A radially inward terminal end of the pin 108 may extend into a second stator pin recess 123 and may serve to limit the degree of angular misalignment between the first stator 110 and second stator 120 as described in further detail below.

The first stator 110 may be configured with a concave surface 112 on a portion thereof. The first stator 110 may be configured with one or more annular recesses 111 on the concave surface 112, and an O-ring 102 may be positioned within each annular recess 111 to adequately mitigate or prevent egress and/or ingress of substances through the area between the first stator 110 and second stator 120 at the interface of the concave surface 112 of the first stator 110 and the convex surface 122a of the second stator 120 (which second stator is described in further detail below).

A second stator 120 may be formed with a main body 122 and an access plate 128, which may be selectively engaged with one another via one or more fasteners 104, which fasteners 104 may pass through portion of the access plate 128 via one or more axial bores 128b formed therein. However, any suitable method and/or apparatus (e.g., welding, chemical adhesives, etc.) may be used to adequately engage the main body 122 with the access plate 128 without limitation unless otherwise indicated in the following claims. The main body 122 may be formed with one or more second stator inlets 124, which may be in fluid communication with the inlet 114a formed in the first stator 110. Generally, the second stator inlet 124 may serve as a passage for sealing fluid to move from the first stator 110 to the radially inward surface of the second stator 120 (and subsequently through the throttle member 130 as described in further detail below). The main body 122 may be formed with a convex surface 122a on the exterior thereof, which convex surface 122a may correspond to the concave surface 112 on the radially interior portion of the first stator 110 to create a semi-spherical interface between the first and second stators 110, 120. For certain applications it is contemplated that it may be beneficial to configure the second stator 120 with a plurality of second stator inlets 124 positioned around the periphery of the second stator 120 (as shown at least in FIG. 19C), but the scope of the present disclosure is not so limited unless otherwise indicated in the following claims.

As shown in FIGS. 18A-18C, the convex surface 122a may be exclusively confined to the main body 122, such that no surface of the access plate 128 constitutes any portion of the convex surface 122a. However, in other embodiments a portion of the convex surface 122a may extend to the access plate 128 without limitation unless otherwise indicated in the following claims. The convex surface 122a may be formed with a convex surface shelf 122b, which may be positioned adjacent to the shelf 112a formed in the concave surface 112 of the first stator 110. The convex surface shelf 122b may be configured such that it is generally linear in the axial dimension. The convex surface shelf 122b in conjunction with the shelf 112a in the first stator 110 may serve to provide a certain volume of sealing fluid within an interface between the first and second stators 110, 120. Accordingly, the optimal configuration (e.g., dimensions, shape, etc.) of the shelf 112a and/or convex surface shelf 122b may vary from one application of the seal assembly 100 to the next without limitation unless otherwise indicated in the following claims.

A portion of the convex surface 122a and/or convex surface shelf 122b may be formed with a second stator pin recess 123, which may receive a distal end of a pin 108 as briefly described above and as shown at least in FIG. 21B. The second stator pin recess 123 and pin 108 may be configured such that the interaction therebetween limits the amount of angular misalignment between the first and second stators 110, 120 during operation. The interaction between the pin 108 and second stator pin recess 123 may also serve to ensure proper axial alignment and/or amount of relative rotation between the first and second stators 110, 120. In one embodiment of a seal assembly 100 two pins 108 may be employed, wherein a first pin 108 associated with one second stator pin recess 123 is positioned at the twelve o'clock position and a second pin 108 associated with another second stator pin recess 123 is positioned at the six o'clock position as shown at least in FIGS. 21B. However, any number and/or configuration of pins 108 and associated second stator pin recesses 123 may be used with the seal assembly 100 without limitation unless otherwise indicated in the following claims. For example, in other embodiments the pins 108 may be configured such that they are positioned in different axes of rotation.

The main body 122 and access plate 128 may be configured such that the access plate 128 is accessible when the shaft sealing member 100 is engaged with an equipment housing. Further, the second stator 120 may be configured such that the access plate 128 may be selectively removed from the main body 122 such that a user may access the throttle member 130 and/or other internal components of the seal assembly 100 without removing the entire seal assembly 100 from an equipment housing. It is contemplated that such a configuration may allow a user to replace and/or inspect the throttle member 130 and/or other interior components of the seal assembly 100 with relative ease compared to the prior art (e.g., without requiring the seal assembly 100 be removed and/or disengaged with the equipment housing).

The main body 122 may be formed with a main body shelf 126, wherein a radially interior surface of the main body shelf 126 may be generally linear in the axial dimension, and wherein the main body shelf 126 may extend axially toward the outboard side of the shaft seal assembly. A radially exterior portion of the access plate 128 may engage the main body 122 at the main body shelf 126, such that the outboard axial limit of the main body 122 is equal to or approximately equal to the outboard axial limit of the access plate 128. However, in other embodiments the outboard axial limit of the main body 122 may be greater than that of the access plate 128, and in still other embodiments the outboard axial limit of the access plate 128 may be greater than that of the main body 122. Accordingly, the scope of the present disclosure extends to all of these various configurations as well as others without limitation unless otherwise indicated in the following claims. The access plate 128 may be formed with a shoulder 128a, which may extend axially inward toward the main body 122, and which shoulder 128a may have one or more axial bores 128b formed therein as previously mentioned above.

The main body 122 and access plate 128 may cooperate to form an internal channel 125 on a radially internal surface of the second stator 120. An axial wall on the inboard side of the main body 122 may provide a first axial limit to the internal channel 125, and the internal axial surface of the access plate 128 may provide a second axial limit to the internal channel 125. The internal channel 125 may be configured such that the radial dimension thereof varies in the axial direction as shown at least in FIG. 18A, wherein the radial dimension of the internal channel 125 adjacent the intermediate portion 133 and second wall 134 of the throttle member 130 is greater than the radial dimension of the internal channel 125 adjacent the first wall 132 of the throttle member 130. However, other configurations of the radial dimension of the internal channel 125 may be used with the seal assembly 100 without limitation unless otherwise indicated in the following claims.

Either the first or second wall 132, 134 of the throttle member 130 may be formed with a throttle member annular recess 131 into which an O-ring may be positioned as shown for the illustrative embodiment at least in FIGS. 18A-19D. Alternatively or additionally, either the axial wall of the main body 122 or the internal axial surface of the access plate 128 may include a second stator annual recess 121 into which an O-ring 102 may be positioned as shown for the illustrative embodiment in FIGS. 21A & 21B. It is contemplated that an O-ring 102 positioned in a second stator annual recess 121 formed in in the main body 122 and/or an O-ring 102 positioned in a throttle member annular recess 131 formed in the second wall 134 may adequately seal an interface between the main body 122 and the throttle member 130. It is further contemplated that an O-ring 102 positioned in a second stator annual recess 121 formed in in the access plate 128 and/or an O-ring 102 positioned in a throttle member annular recess 131 formed in the first wall 132 may adequately seal an interface between the access plate 128 and the throttle member 130 in order to mitigate or prevent ingress of substances and/or egress of sealing fluid at those interfaces. However, any suitable structure and/or method may be used to achieve the desired seal between the main body 122 and throttle member 130 and/or between the access plate 128 and throttle member 130 (e.g., other mechanical sealing devices, chemical seals, combinations thereof, etc.) without limitation unless otherwise indicated in the following claims.

As shown at least in FIGS. 18A-18C, 19A, and 21B the internal channel 125 may have various contours and/or surfaces thereon. For example, a portion of the internal channel 125 formed in the main body 122 may be configured with transitions from axial to radial surfaces that are smooth and/or radiused. By contrast, another portion of the internal channel 125 formed in the access plate 128 may be configured with transitions from axial to radial surfaces that are right angles. The optimal configuration (e.g., actual volume, relative volume, shape, axial dimension, radial dimension, etc.) of the internal channel 125 may vary from one application of the seal assembly 100 to the next and is therefore in no way limiting to the scope of the present disclosure unless otherwise indicated in the following claims.

A throttle member 130 may be positioned within a portion of the internal cavity 125 in the second stator 120. Generally, the throttle member 130 may be configured with an inboard axial surface that may engage and/or be positioned adjacent to a portion of the main body 122 of the second stator 120 and an outboard axial surface that may engage and/or be positioned adjacent to a portion of the access plate 128. A radially interior surface of the throttle member 130 may be positioned adjacent a shaft 12. The throttle member 130 may be configured with a first wall 132 adjacent the access plate 128 and a second wall 134 adjacent the main body 122 of the second stator 120, and an intermediate portion 133 may be positioned between the first and second walls 132, 134. Both the first wall 132 and second wall 134 may extend radially outward such that a throttle member channel 136 is present between the first and second walls 132, 134.

The first wall 132 may be formed with one or more first wall axial projections 132a extending therefrom, as shown at least in FIG. 18B, which may correspond to one or more axial recesses 127 formed in the access plate 128. Additionally or alternatively, the second wall 134 may be formed with one or more axial projections 134a extending therefrom that correspond to one or more axial recesses 127 formed in formed in main body 122 of the second stator 120. The axial projections 132a, 134a may be formed integrally with a portion of the throttle member 130 or they may be formed separately therefrom and later engaged with a portion of the throttle member 130 (wherein the axial projections 132a, 134a may serve as a type of pin or dowel) without limitation unless otherwise indicated in the following claims. A portion of the axial projection 132a, 134a may extend into an axial recess 127 formed in the main body 122 of the second stator 120 and/or an axial recess 127 formed in the access plate 128 so as to prevent and/or mitigate relative rotational movement between the throttle member 130 and the second stator 120 and/or to limit the amount of relative radial movement therebetween without limitation unless otherwise indicated in the following claims. Alternatively or in addition, the amount of relative radial movement between the throttle member 130 and second stator 120 may be limited by the configuration of the first wall 132, second wall 134, radially interior surface of the main body 122, and/or radially interior surface of the access plate 128. Specifically, the radial dimension of those components may be adjusted such that a specific amount of radial movement of the throttle member 130 may occur prior to the terminal end of either the first wall 132 or second wall 134 contacting a portion of the second stator 120 within the internal channel 125. As shown in FIG. 18A, the configuration of the terminal end of the first wall 132 and a radially interior surface of the second stator 120 and/or cap 128 so as to define an annular space 129 in which the throttle member 130 may move in the radial dimension with respect to the second stator 120 (and consequently, with respect to the other components of the seal assembly 100). However, the scope of the present disclosure is not so limited unless otherwise indicated in the following claims.

The throttle member channel 136 may be configured such that it intersects all or a portion of the internal channel 125, wherein the throttle member channel 136 and internal channel 125 may cooperate to form an annular cavity within the seal assembly 100. It is contemplated that for certain applications the throttle member 130 may be configured such that sealing fluid within the internal cavity 125 may be preferentially directed toward the radial channels 133a formed in the throttle member, and/or one or more radial interfaces between the throttle member 130 and main body 122 and/or throttle member 130 and access plate 128, but the scope of the present disclosure is not so limited unless indicated in the following claims.

The intermediate portion 133 of the throttle member 130 may be formed with one or more radial channels 133a therein, which may serve to provide sealing fluid from the internal channel 125 of the second stator 120 through the throttle member 130 and to an area radially interior with respect to the throttle member 130 (e.g., a shaft 12). It is contemplated that the radial channels 133a in the throttle member 130 may be configured as pairs arranged annularly around the throttle member 130. However, the optimal number and configuration (e.g., size, position, etc.) of the radial channels 133a may vary from one application of the seal assembly 100 to the next and is therefore in no way limiting to the scope thereof unless otherwise indicated in the following claims. Additionally or alternatively, the first wall 132 and/or second wall 134 may be configured with axial channels to direct sealing fluid from the internal channel 125 of the second stator 120 through the axial channel of the throttle member 130 to an interface between the throttle member 130 and the main body 122 and/or an interface between the throttle member 130 and the access plate 128. It is contemplated that such a configuration may serve to axially balance the pressure across the throttle member 130 and/or seal assembly 100 for certain applications without limitation unless otherwise indicated in the following claims.

As previously described above regarding the internal channel 125 of the second stator 120, the optimal configuration (e.g., actual volume, relative volume, shape, axial dimension, radial dimension, etc.) of the throttle member 130 and components thereof (e.g., first wall 132 and the configuration thereof, radial channels 133a and configuration thereof, intermedia portion 133 and configuration thereof, second wall 134 and the configuration thereof, the throttle member channel 136, axial channels formed in either wall 132, 134, etc.) may vary from one application of the seal assembly 100 to the next and is therefore in no way limiting to the scope of the present disclosure unless otherwise indicated in the following claims.

Generally, the seal assembly 100 may be configured such that relative radial movement between a shaft 12 positioned in the central bore of the seal assembly 100 and the seal assembly 100 and/or equipment housing to which the seal assembly 100 is engaged may be accommodated via relative radial movement between the throttle member 130 and the second stator 120 within the internal channel 125 of the second stator 120. Further, the seal assembly 100 may be configured such that relative axial movement between a shaft 12 positioned in the central bore of the seal assembly 100 and the seal assembly 100 and/or equipment housing to which the seal assembly 100 is engaged may be accommodated via an interface between the radially interior surface of the throttle member 130 and a radially exterior surface of the shaft 12. It is contemplated that for many applications a sealing fluid may be provided to this interface via one or more radial channels 133a formed in the throttle member 130 as previously described above. The optimal clearance of the interface between the throttle member 130 and the shaft 12 may vary from one application of the seal assembly 100 to the next and is therefore in no way limiting to the scope thereof unless otherwise indicated in the following claims. However, for at least some applications it is contemplated that this clearance may be between 0.001 inches and 0.5 inches, and the clearance may affect the flow characteristics of the sealing fluid (e.g., greater clearances may result in a relatively higher volumetric flow rate of sealing fluid under otherwise equal conditions and configurations).

Generally, for the various illustrative embodiments of the seal assembly 100, the throttle member 130 may be constructed of any suitable material, including but not limited to polymers (e.g., polyether ether ketones, graphalloy, nyloil, carbon, etc.) and/or any other lubricous material without limitation unless otherwise indicated in the following claims.

Figure 20A:
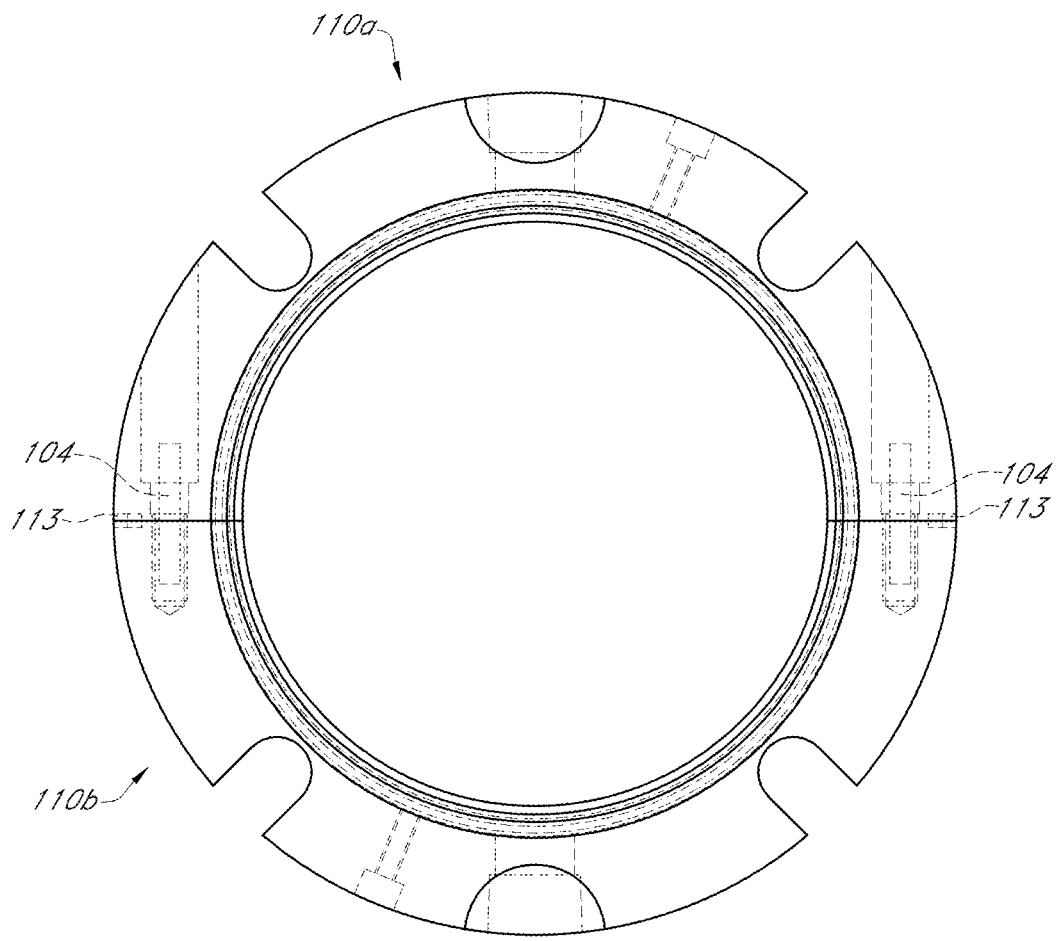
FIG. 20A is a plane front view of another embodiment of a shaft seal assembly showing
Figure 20B:
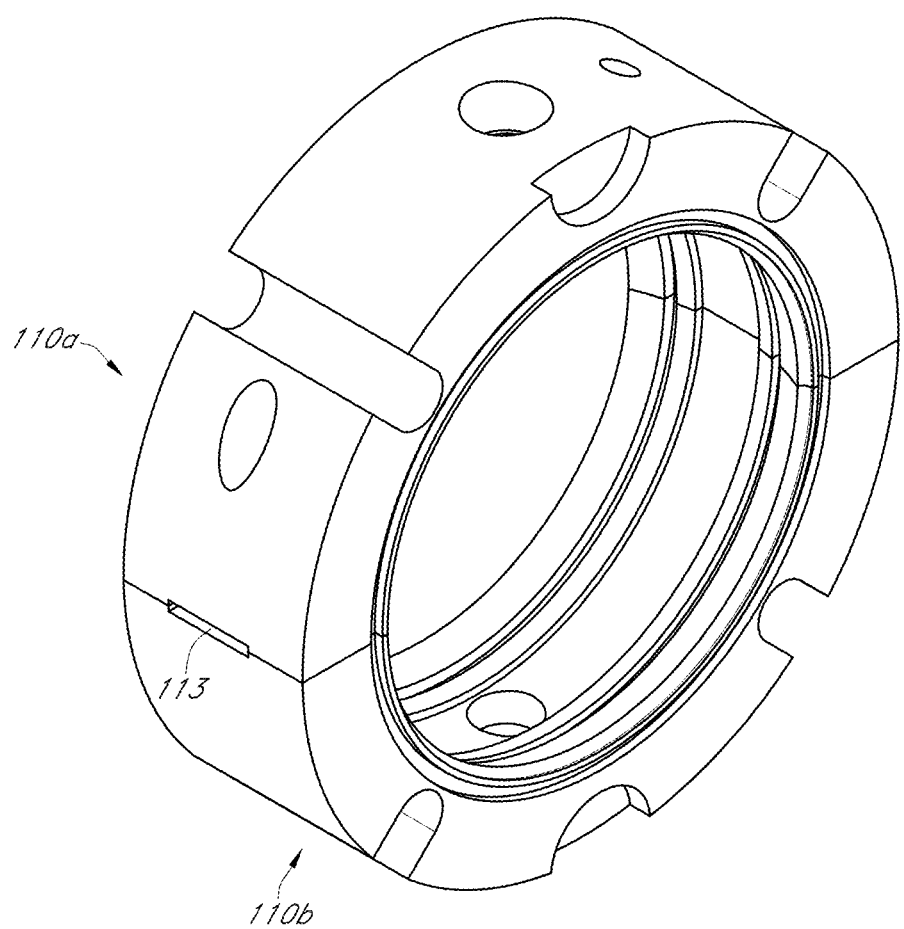
FIG. 20B is a perspective view of the illustrative embodiment of a shaft seal assembly shown in FIG. 20A

Referring now specifically to FIGS. 20A & 20B, another illustrative embodiment of a seal assembly 100 according to the present disclosure is shown therein. Generally, this illustrative embodiment may be configured with the same, similar, or correlative elements as that previously described and shown in FIGS. 18-19D and provide the same, similar, or correlative benefits thereas. However, the seal assembly 100 shown in FIGS. 20A & 20B may be configured such that the first stator 110 may be bifurcated along a horizontally oriented plane that passes through the longitudinal axis of a shaft 12 around which the seal assembly 100 is positioned. The two portions of the first stator 110 may be referred to as an upper portion 110a and a lower portion 110b. As the seal assembly 100 may be installed in an application wherein the longitudinal axis of the shaft 12 is vertically oriented or oriented as some angle between horizontal and vertical, the terms "upper" and "lower" and description of a horizontally oriented plane are not limiting to the scope of the seal assembly 100, but instead meant to provide context for the relative positions of the upper portion 110a and lower portion 110b unless otherwise indicated in the following claims.

The upper portion 110a and lower portion 110b may be selectively engaged with one another via one or more fasteners 104, corresponding receivers 105, and corresponding apertures 106. Additionally, alignment pins and/or dowels may be employed to ensure proper alignment between the upper portion 110a and lower portion 110b. In the illustrative embodiment the fasteners 104 may be configured as mechanical fasteners (e.g., bolts, screws, etc.), wherein each fastener 104 passes through a first aperture 106 formed in the upper portion 110a and a distal end thereof engages a receiver 105 formed in the lower portion 105, wherein the receiver 105 may be threaded such that it corresponds with threads formed on the fastener 104. However, any suitable structure and/or method for selectively engaging the upper portion 110a with the lower portion 110b (e.g., other types of mechanical fasteners, clamps, adhesives, etc.) may be used without limitation unless otherwise indicated in the following claims.

In certain applications it may be beneficial to use a first stator 110 that is comprised of an upper portion 110a and a lower portion 110b. Such a configuration may provide additional axial space around the exterior of the first stator 110, such that the size of the inlet 114a may be increased compared to a shaft seal assembly 110 of similar size having an inner member 114 and outer member 116. Such a configuration may allow relatively easier replacement of one or more O-rings 102 with cord stock and/or without the need to disassemble the equipment with which the seal assembly 100 is engaged. In other applications, a first stator 110 configured with an upper portion 110a and a lower portion 110b may allow for an easier installation than a seal assembly 100 having an inner member 114 and an outer member 116 due to a decreased number of fasteners 104. Finally, a first stator 110 comprised of an upper portion 110a and lower portion 110b may provide manufacturing benefits as fewer elements are required to be configured with a concave surface 112 compared to a shaft seal assembly 110 of similar size having an inner member 114 and outer member 116. Either the upper portion 110a and/or the lower portion 110b may be configured with one or more slots 113 to assist a user in separating the upper portion 110a from the lower portion 110b and/or to disengage the seal assembly 100 from an associated shaft 12 and/or other equipment.

In addition to the first stator 110 being bifurcated along a horizontally oriented plane that passes through the longitudinal axis of a shaft 12 around which the seal assembly 100 is positioned, the second stator 120, throttle member 130, and/or access plate 128 may be so bifurcated. It is contemplated that such a configuration may reduce the labor and/or time associated with installation of the seal assembly 100 by allowing installation of the seal assembly 100 around a shaft 12 without the need to disassemble much or any of the equipment associated with the shaft 12. In such a configuration, the two halves of any split component (e.g., first stator 110, second stator 120, throttle member 130, access plate 128, etc.) may be selectively engaged with one another via any suitable structure and/or method as previously described above in regards to the first stator 110 upper portion 110a and lower portion 110b without limitation unless otherwise indicated in the following claims.

Figure 21A:
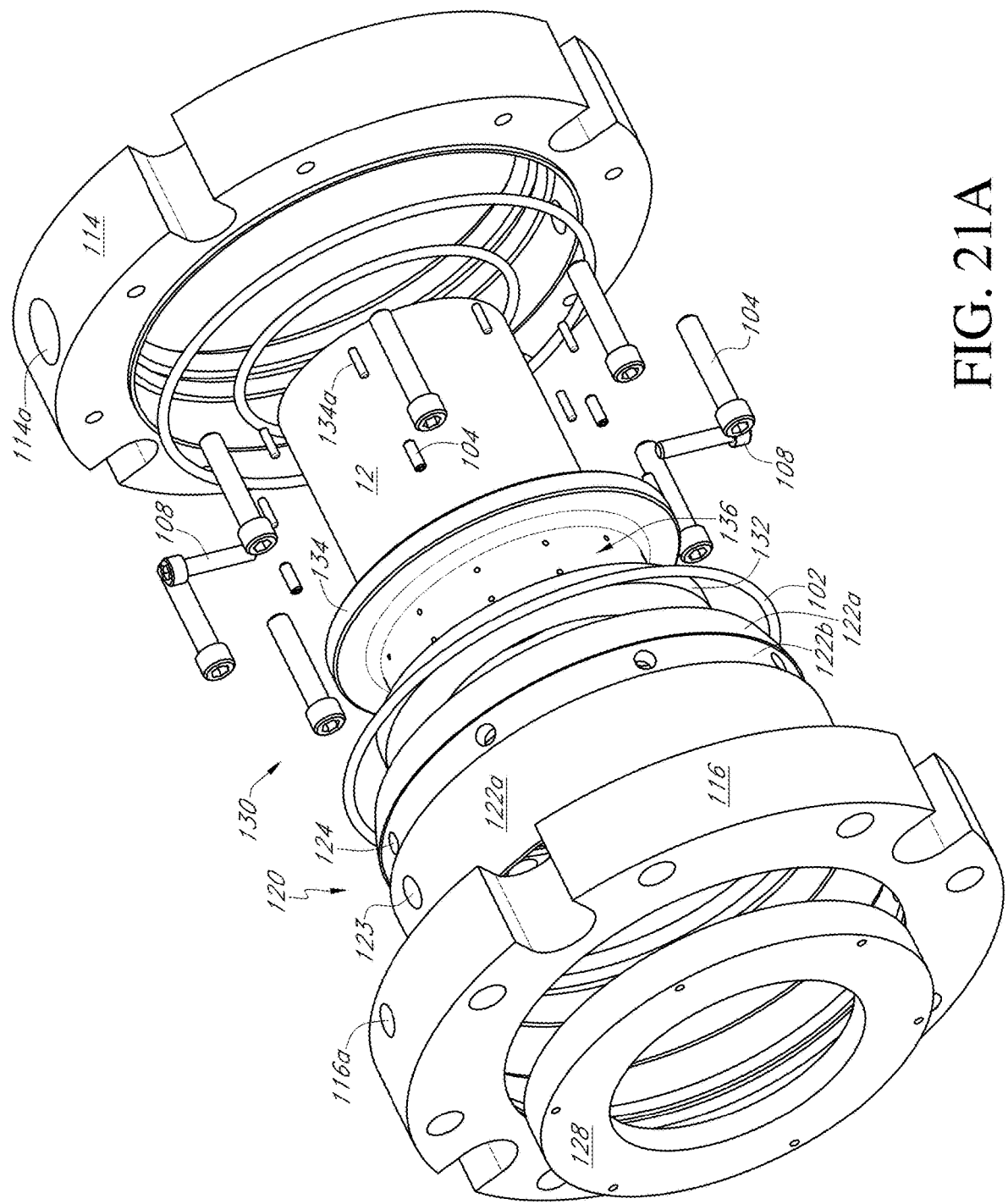
FIG. 21A is a perspective, exploded view of another illustrative embodiment of a shaft seal assembly with the outboard side in the foreground.
Figure 21B:
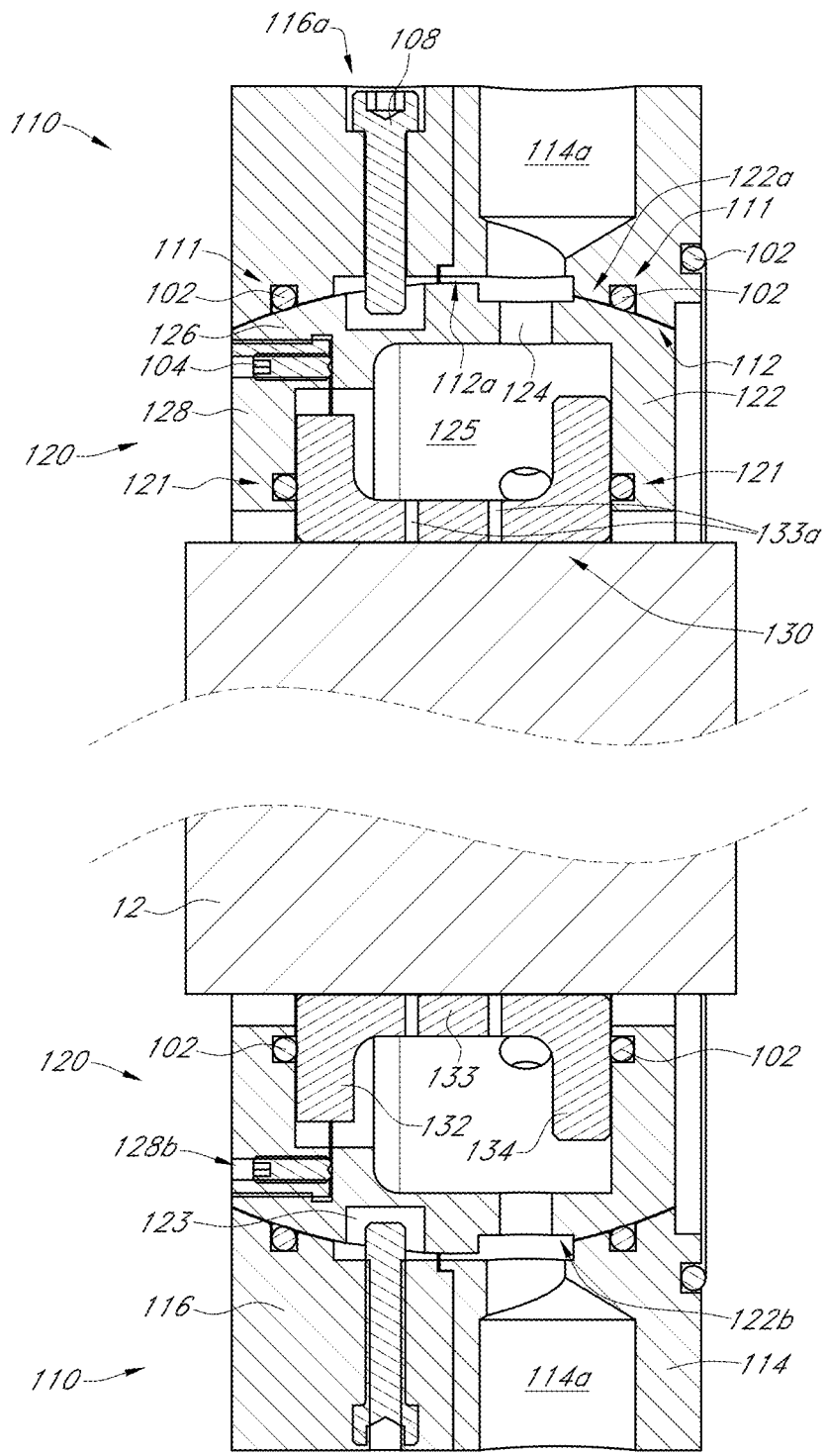
FIG. 21B is a cross-sectional view of the illustrative embodiment of a shaft seal assembly shown in FIG. 21A along the longitudinal axis of a shaft engaged with the shaft seal assembly.

Referring now specifically to FIGS. 21A & 21B, another illustrative embodiment of a seal assembly 100 according to the present disclosure is shown therein. Generally, this illustrative embodiment may be configured with the same, similar, or correlative elements as that previously described and shown in FIGS. 18-19D and provide the same, similar, or correlative benefits thereas. However, the seal assembly 100 shown in FIGS. 21A & 21B may be configured such that the first stator 110 may include an inner member 114 and an outer member 116, which may be engaged with one another.

The inner member 114 of the first stator 110 may be formed with an inlet 114a to which a sealing fluid may be provided. Additionally, the inner member 114 may be formed with an annular recess 111 on an inboard face thereof into which an O-ring 102 may be positioned. It is contemplated that the O-ring 102 may adequately seal the inboard side of the first stator 110 to the equipment housing in order to mitigate or prevent ingress of substances toward a product adjacent an equipment housing and egress of a product at the interface of the seal assembly 100 and equipment housing. However, any suitable structure and/or method may be used to achieve the desired seal between the seal assembly 100 and equipment housing (e.g., other mechanical sealing devices, chemical seals, combinations thereof, etc.) without limitation unless otherwise indicated in the following claims.

The outer member 116 may be formed with one or more pin recesses 116a, and a pin 108 may be inserted into the pin recess 116a. A radially inward terminal end of the pin 108 may extend into a second stator pin recess 123 and may serve to limit the degree of angular misalignment between the first stator 110 and second stator 120 as described in further detail below.

The inner member 114 and outer member 116 may cooperate to provide a concave surface 112 on a portion thereof, wherein a first portion of the concave surface 112 may be configured on the inner member 114 and a second portion of the concave surface 112 may be configured on the outer member 116. A shelf 112a may be positioned between the first and second portions of the concave surface 112, wherein the shelf 112a may be generally linear in the axial dimension as shown at least in FIGS. 18B and 18C. Finally, both the inner member 114 and outer member 116 may be configured with an annular recess 111 on the concave surface 112, and an O-ring 102 may be positioned within each annular recess 111 to adequately mitigate or prevent egress and/or ingress of substances through the area between the first stator 110 and second stator 120 at the interface of the concave surface 112 of the first stator 110 and the convex surface 122a of the second stator 120 (which second stator is described in further detail below).

The seal assembly 100 shown in FIGS. 18-21B may enjoy several advantages over the prior art. One advantage may be that the mass of the elements of the seal assembly 100 that physically move to accommodate radial shaft 12 movement is lower than the mass of those elements in the prior art, as only the throttle member 130 is required to physically move, which may allow faster reaction and lead to relatively better sealing and a relatively longer life of the seal assembly 100. Another advantage may be that the relative axial position of the access plate 128 with respect to the main body 122 may be adjusted by configuring the outer diameter of the access plate 128 with threads that correspond to threads on the inner diameter of the second stator 120 (which threads may be formed on a radially interior surface of the main body shelf 126), which may allow the user to adjust the amount of compression of one or more O-rings 102 adjacent the throttle member 130. This in turn may allow the user to adjust the amount for force required to move the throttle member 130 with respect to the second stator 120 in the radial dimension. The fasteners 104 positioned in the axial bores 128*b* of the access plate 128 may provide a grip point form rotating the access plate 128 with respect to the second stator 120 and/or may provide a locking mechanism (e.g., as a type of set screw) to secure the position of the access plate 128 with respect to the second stator 120 (which position may otherwise be changed due to external forces, vibration, etc.).

The specific configuration, number, and/or physical dimensions of the various features of the fixed stator 20, floating stator 30, and/or sealing member 40 (e.g., the radial dimension of the annular recess 26, the surface area of the concave surface 38 and/or convex surface 48, the diameter, length, and orientation of the radial bores 44, etc.) may vary depending on the specific application of the shaft seal assembly 10. Additionally, the optimal configuration, number, and/or physical dimensions of the various features of the first stator 110 and/or components thereof (e.g., inner member 114, outer member 116, etc.), second stator 120 and/or components thereof (e.g., main body 122, convex surface shelf 122*b*, internal channel 125, access plate 128, etc.), and/or throttle member 130 and/or components thereof (e.g., first wall 132, intermediate portion 133, second wall 134, throttle member channel 136, etc.) may vary depending on the specific application of the seal assembly 100. These variations may be utilized to accommodate different sizes of shafts 12 and/or shaft seal assemblies 100 and different amounts and/or types of relative movement between a shaft 12 and seal assembly 100.

The materials used to construct the apparatuses and/or components thereof apparatus disclosed herein will vary depending on the specific application thereof, but it is contemplated that polymers, synthetic materials, metals, metal alloys, (e.g., bronze, brass, stainless steel, or other metals and/or metallic alloys and/or combinations thereof), and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various apparatuses and methods, other features thereof will undoubtedly occur to those versed in the art, as will numerous modifications and alterations in the embodiments and/or aspects as illustrated herein, all of which may be achieved without departing from the spirit and scope of the present disclosure. Accordingly, the embodiments of the apparatuses and methods pictured and described herein are for illustrative purposes only, and the scope of the present disclosure extends to all processes, apparatuses, and/or structures for providing the various benefits and/or features of the present disclosure (which benefits may include but are not limited to accommodating shaft(s) misalignment with respect to a housing and/or shaft seal assembly, whether the misalignment is angular, radial, and/or axial; and for configuring a shaft seal assembly to create a pressurized fluid barrier between a rotating element and a non-rotating element) unless otherwise indicated in the following claims.

While the apparatuses and methods here have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the apparatuses and methods pictured and described herein are in no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the apparatuses and methods are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, method steps, etc. of the apparatuses and methods may be used alone or in combination with one another depending on the compatibility of the features, components, functionalities, advantages, aspects, configurations, method steps, etc. Accordingly, a nearly infinite number of variations of the present disclosure exist. Modifications and/or substitutions of one feature, component, functionality, aspect, configuration, method step, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order.

Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

What is claimed is:

1. An annular seal assembly comprising:
    a first stator having a concave surface formed on a radially interior portion thereof;
    a second stator positioned within said first stator, wherein said second stator is formed with a convex surface on a radially exterior portion thereof, wherein said concave surface of said first stator and said convex surface of said second stator form a semispherical interface between said first stator and said second stator, and wherein said second stator is formed with an internal channel on a radially interior surface thereof;

a singular throttle member positioned within said internal channel of said second stator, wherein said throttle member is formed with an intermediate portion between a first wall and a second wall, and wherein a circumference of said intermediate portion is less than a circumference of said first wall and a circumference of said second wall; and an access plate engaged with an axially oriented surface of said second stator, wherein:

a surface of said access plate and a surface of said second stator spaced in parallel opposition to the surface of said access plate define a pair of opposing sides of the internal channel, and said throttle member directly contacts and slidably engages said pair of opposing sides of the internal channel such that said throttle member slides radially with respect to said second stator in said internal channel.

2. The annular seal assembly according to claim 1 wherein said first stator further comprises an inlet extending from a radially exterior surface of said first stator to said concave surface.

3. The annular seal assembly according to claim 2 wherein said second stator further comprises a second stator inlet extending from a radially exterior surface of said second stator to said internal channel.

4. The annular seal assembly according to claim 3 wherein said throttle member further comprises a radial channel in said intermediate portion, wherein said radial channel extends from a radially exterior surface of said intermediate portion to a radially interior surface of said intermediate portion.

5. The annular seal assembly according to claim 4 wherein said throttle member further comprises a plurality of radial channels in said intermediate portion, wherein said plurality of radially channels are equally distributed around the periphery of said intermediate portion.

6. The annular seal assembly according to claim 1 wherein said concave surface further comprises a shelf formed therein.

7. The annular seal assembly according to claim 1 wherein said convex surface further comprises a convex surface shelf.

8. The annular seal assembly according to claim 1 wherein said second stator further comprises:
a. a main body, wherein said internal channel is formed in a portion of said main body; and,
b. a main body shelf extending axially outward from said main body, wherein said access plate is positioned adjacent a radially interior surface of said main body shelf.

9. The annular seal assembly according to claim 1 wherein said first stator is further defined as being comprised of an upper portion and a lower portion.

10. The annular seal assembly according to claim 1 wherein said annular seal assembly is further defined as being bifurcated along a diameter of said annular seal assembly.

11. The annular seal assembly according to claim 1 wherein said throttle member further comprises a throttle member annular recess formed in an axially exterior surface of said second wall, and wherein an O-ring is positioned in said throttle member annular recess such that said O-ring is held in said throttle member annular recess between said throttle member and said second stator.

12. The annular seal assembly according to claim 1 wherein said concave surface further comprises an annular recess formed therein, and wherein an O-ring is positioned in said annular recess.

13. The annular seal assembly according to claim 1 wherein said second stator is moveable with respect to said first stator about said semispherical interface such that a longitudinal axis of said second stator may be misaligned with respect to a longitudinal axis of said first stator.

14. The annular seal assembly according to claim 1 wherein said access plate is further defined as being engageable with said second stator in a threaded manner.

15. A seal assembly comprising:
an annular stator having a concave surface formed on a radially interior portion thereof;
a second stator positioned within said first stator, wherein said second stator is formed with a convex surface on a radially exterior portion thereof, and wherein said concave surface of said first stator and said convex surface of said second stator form a semispherical interface between said first stator and said second stator;
an access plate engaged with said second stator, wherein said access plate and said second stator form an internal channel on a radially interior surface of said access plate and said second stator; and,
a singular throttle member positioned within said internal channel, wherein said throttle member is formed with an intermediate portion between a first wall and a second wall, wherein said first wall and said second wall extend radially beyond said intermediate portion,
wherein:
a surface of said access plate and a surface of said second stator spaced in parallel opposition to the surface of said access plate define a pair of opposing sides of the internal channel, and
said throttle member directly contacts and slidably engages said pair of opposing sides of the internal channel such that said throttle member slides radially with respect to said second stator in said internal channel.

16. The annular seal assembly according to claim 15 wherein said first stator further comprises an inlet extending from a radially exterior surface of said first stator to said concave surface.

17. The annular seal assembly according to claim 16 wherein said second stator further comprises a second stator inlet extending from a radially exterior surface of said second stator to said internal channel.

18. The annular seal assembly according to claim 17 wherein said throttle member further comprises a plurality of radial channels in said intermediate portion, wherein said plurality of radially channels are equally distributed around the periphery of said intermediate portion.

19. An annular seal assembly comprising:
a first stator having a concave surface formed on a radially interior portion thereof;
wherein said first stator is configured to be engageable with a housing having a shaft extending from and rotatable with respect to said housing, and wherein said first stator is configured to be positioned over a periphery of said shaft;
a second stator positioned within said first stator and over said periphery of said shaft; and an access plate engaged with an axially oriented surface of said second stator, and wherein said second stator is formed with a convex surface on a radially exterior portion thereof, wherein said concave surface of said first stator and said convex surface of said second stator form a semispherical interface between said first stator and said second stator, and wherein said second stator is formed with an internal channel on a radially interior surface thereof; and, a singular throttle member positioned within said internal channel of said second stator and adjacent said periphery of said shaft, wherein said throttle member is formed with an intermediate portion between a first wall and a second wall, wherein said first wall and said second wall extend radially beyond said intermediate portion, wherein:

a surface of said access plate and a surface of said second stator spaced in parallel opposition to the surface of said access plate define a pair of opposing sides of the internal channel, and said throttle member directly contacts and slidably engages said pair of opposing sides of the internal channel such that said throttle member slides radially with respect to said second stator in said internal channel.

20. The annular seal assembly of claim 1, wherein the throttle member comprises an annular recess in a surface contacting one of the pair of opposing sides of the internal channel, the annular seal assembly further comprising an O-ring disposed in the annular recess of the throttle member and configured to seal against the opposing side of the internal channel.

* * * * *